United States Patent [19]

Akutagawa et al.

[11] Patent Number: 5,750,285
[45] Date of Patent: May 12, 1998

[54] LIFE INDICATOR AND LEAD-ACID STORAGE BATTERY WITH LIFE INDICATOR

[75] Inventors: Tadamasa Akutagawa, Tokyo; Shigeru Sano; Aya Nishino, both of Takatsuki, all of Japan

[73] Assignee: Yuasa Corporation, Tokyo, Japan

[21] Appl. No.: 518,333

[22] Filed: Aug. 23, 1995

[30] Foreign Application Priority Data

Aug. 25, 1994 [JP] Japan .................. 6-200518
Aug. 9, 1995 [JP] Japan .................. 7-203251

[51] Int. Cl.$^6$ .................................................. H01M 10/48
[52] U.S. Cl. .................. 429/92; 429/90; 324/435; 340/636
[58] Field of Search .................. 429/90, 92, 225, 429/226; 324/426, 427, 434, 435; 340/636

[56] References Cited

U.S. PATENT DOCUMENTS

| 4,992,340 | 2/1991 | Tidwell et al. .................. 429/7 |
| 5,130,658 | 7/1992 | Bohmer .................. 324/435 |
| 5,304,433 | 4/1994 | Cherng .................. 429/91 |

FOREIGN PATENT DOCUMENTS

| 24 48 068 | 4/1976 | Germany. |
| 2448068 | 4/1976 | Germany. |
| 29 25 248 | 1/1981 | Germany. |

OTHER PUBLICATIONS

Japio Abstract Section E, Section No. 623, vol. 12, No. 215, p. 66 & JP 63010476 (Shin Kobe) * Abstract Jan., 1988.
Japio Abstract Section E, Section No. 527, vol. 11, No. 231, p. 130 & JP 62047975 (Shin Kobe) * Abstract Mar., 1987.

*Primary Examiner*—M. Nuzzolillo
*Attorney, Agent, or Firm*—Evenson, McKeown, Edwards & Lenahan, P.L.L.C.

[57] ABSTRACT

The purpose of this invention is to provide a life indicator which can detect an occurrence of growth and obtain various information based on it. A life indicator of this invention having at least a sensor portion, a sending circuit, a receiving circuit and a light emitting diode. The sensor portion is adapted to be applied with a pressure based on an elongation of a positive plate directly or indirectly, so as to detect the applied pressure as a change of electric parameter.

19 Claims, 22 Drawing Sheets

LIFE INDICATOR AND LEAD-ACID STORAGE BATTERY WITH LIFE INDICATOR

BACKGROUND OF THE INVENTION

This invention relates to a life indicator which can detect a life of lead-acid storage battery affected by an elongation of a positive plate (abbreviated to "growth" hereunder), and a lead-acid storage battery equipped with the life indicator.

FIG. 37 is a partially fragmental oblique view showing a general conventional sealed-type lead-acid storage battery. As shown in the figure, positive plates 1 and negative plates 2 are laminated alternately each other in plural with separators 3 put between them. Terminal pieces 11 of the positive plates 1 are connected to a positive strap 12, and terminal pieces 21 of the negative plates 2 are connected to a positive strap 22, respectively. Thereby, a group of positive and negative plates 4 is composed. The positive plate 1 holds an active material 14 to a lattice body 13 forming a skeleton, and the negative plate 2 holds the active material to the lattice body in the same manner. The group of positive and negative plates 4 is housed in a container 5, and the container 5 is sealed by a cover 6.

In the lead-acid storage battery having such a construction, when the lattice body 13 of the positive plate 1 was elongated due to corrosion etc. i.e. an occurrence of growth, such troubles might occurred that the lattice body 13 contacted with the negative strap 22 to induce short-circuiting, the cover 6 was pushed up by the growth to impair an air-tightness, and the container 5 was pushed to be broken. In other words, the growth gave rise to heating and leakage of sulfuric acid to cause accidents such as firing and pollution of peripheral equipment etc. Further, when the growth occurred, the active material 14 was apt to fall off by being isolated so that a battery life might be exhausted before exhaustion of a life of the active material 14.

Such a growth becomes a remarkable problem in the sealed-type lead-acid storage battery rapidly spreading in recent years. A material made of lead-calcium alloy is frequently used for the lattice body 13 for the sealed-type lead-acid storage battery, however, the growth occurs remarkably in this material. Since an inside of the sealed-type lead-acid storage battery can not be observed, an influence of trouble due to the growth becomes serious. In addition, the growth is mainly caused by the corrosion, and an extent and speed of growth are not constant but influenced by a composition of the lattice body 13, temperature, charging current, and clearance of gap in the container 5 etc. For this reason, the growth might be restricted depending on service conditions to cause exhaustion of the battery life due to softening or falling-off of the active material itself. Accordingly, it was difficult to predict or prevent the occurrence of growth. Because a behavior of battery did not change until the short-circuiting and breakage were brought about even if the growth occurred, troubles occurred without detecting the occurrence of growth.

SUMMARY OF THE INVENTION

An object of this invention is to provide a life indicator which can detect an occurrence of growth and obtain various information based on the detection, and to provide a lead-acid storage battery which can prevent an occurrence of trouble caused by the growth.

In order to accomplish the above-mentioned object, the life indicator has at least a sensor portion, a sending means sending a change of electric parameter detected by the sensor portion as an electric signal, a receiving means receiving a sent signal, and an indicator means indicating the received signal, the sensor portion is adapted to receive an applied pressure based on an elongation of a positive plate directly or indirectly, so as to detect the applied pressure as a change of electric parameter.

According to the life indicator the, occurrence of growth (elongation of the positive plate) can be detected at the sensor portion as the change of electric parameter. Consequently, various information based on the occurrence of growth can be obtained.

In addition, the change of electric parameter detected at the sensor portion can be indicated by the indicator means through the sending means and the receiving means. Consequently, the occurrence of growth can be recognized.

A life indicator is so composed that the sending means has a primary coil, the receiving means has a secondary coil, and the both means are adapted to transmit the electric signal through electromagnetic induction.

According to the life indicator, the sending means and the receiving means can transmit the electric signal under the non-contact state. Consequently, when fitting these means to the lead-acid storage battery, it is not necessary to make wiring ports on the cover or the container so that a workability in manufacture can be improved.

A life indicator is so composed that the sending means is adapted to oscillate when the sensor portion detects a creation of electric signal as a change of electric parameter.

According to the life indicator, the creation of electric signal detected at the sensor portion can be sent securely and the occurrence of growth can be detected.

A life indicator is so composed, that the sending means is adapted to be in an open-state when the sensor portion detects a cut-off of electric signal as a change of electric parameter.

According to the life indicator, the cut-off of electric signal detected at the sensor portion can be sent securely and the occurrence of growth can be detected.

A life indicator is so composed, that the sending means is adapted to send a frequency information corresponding to a change of electric signal when the sensor portion detects the change as a change of electric parameter.

According to the life indicator, the change of electric signal detected at the sensor portion can be sent securely and the extent of occurrence of growth can be detected in stages.

A life indicator is so composed that the sensor portion has a resilient pressed part and a pair of electric contacts, and the pair of electric contacts are adapted to close or open when the pressed part is applied with pressure.

According to the life indicator, since a pair of electric contacts close or open to cause the change of electric parameter, the occurrence of growth can be detected securely.

A life indicator is so composed that the sensor portion has a resilient pressed part and a pressure-sensitive conductor connecting a pair of electric contacts installed with a distance put between them, and is adapted to detect a change of resistance value of the pressure-sensitive conductor when the pressed part is applied with pressure.

According to the life indicator, since the resistance value of the pressure-sensitive conductor changes to cause the change of electric parameter i.e. the change of electric signal, the stage of occurrence of growth can be detected securely.

A life indicator is so composed, that a spacer is installed between the sensor portion and a positive plate, and the spacer is adapted to apply a pressure on the sensor portion on receipt of the elongation of the positive plate.

According to the life indicator, since the spacer is put between the growth and the sensor portion, the occurrence of growth can be detected in an early stage and different occurring stages can be detected too.

A life indicator is so composed that the spacer comprises a sheet body mounted on a group of positive and negative plates and a bar body fixed to the sensor portion perpendicularly to the sensor portion.

According to the life indicator, since the growth can be received by the sheet body even when the growth occurs at any place on the upper face of the group of positive and negative plates, the occurrence of growth can be detected without omission.

A life indicator is so composed, that the spacer comprises only a bar body fixed to the sensor portion perpendicularly to the sensor portion.

According to the life indicator, the occurrences of growth at the places fronting on the sensor portions can be detected in an early stage and its structure is simple.

A lead-acid storage battery having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate directly or indirectly, so as to detect the pressure as a change of electric parameter.

According to the lead-acid storage battery with life indicator, the occurrence of growth can be detected at the sensor portion as the change of electric parameter. Consequently, various information based on the occurrence of growth, such as exhaustion of life of the lead-acid storage battery or remaining life of it etc., can be obtained.

In addition, the change of electric parameter detected at the sensor portion can be indicated by the indicator means through the sending means and the receiving means.

A lead-acid storage battery with life indicator is so composed that the sending means has a primary coil, the receiving means has a secondary coil, and the both means are adapted to transmit the electric signal through electromagnetic induction.

According to the lead-acid storage battery with life indicator, the sending means and the receiving means can transmit the electric signal under the non-contact state. Consequently, it is not necessary to make wiring ports on the cover or the container of lead-acid storage battery to which the life indicator is fitted, so that a workability for fitting can be improved.

A lead-acid storage battery with life indicator is so composed that the sensor portion is installed on a cover inside face, the sending means is installed in the cover inside, and the receiving means and the indicator means are installed on a cover outside face.

According to the lead-acid storage battery with life indicator, since the stage before the growth strongly contacting with the cover can be detected, the air-tightness can be prevented from being impaired due to the cover pushed up by the growth. Further, the occurrence of growth can be recognized by visually observing the indicator means on the cover outside face.

A lead-acid storage battery with life indicator is so composed that the sensor portion is installed on a lower face of a negative strap, the sending means is installed in a cover inside or container side wall inside, and the receiving means and the indicator means are installed on a cover outside face or a container side wall outside face.

According to the lead-acid storage battery with life indicator, since the stage before the growth contacting with the negative strap can be detected, the short-circuiting due to contacting of the growth with the negative strap can be prevented. Further, the occurrence of growth can be recognized by visually observing the indicator means on the cover outside face.

A lead-acid storage battery with life indicator is so composed that the sensor portion is installed on a container side wall inside face, the sending means is installed in a container side wall inside, and the receiving means and the indicator means are installed on a container side wall outside face.

According to the lead-acid storage battery with life indicator, since the stage before the growth strongly contacting with the side wall of container can be detected, the container can be prevented from being broken by the growth. Further, the occurrence of growth can be recognized by visually observing the indicator means on the cover outside face.

A lead-acid storage battery with life indicator is so composed that the life indicator has a spacer between the sensor portion and the positive plate, the spacer is adapted to apply a pressure on the sensor portion on receipt of the elongation of the positive plate, the spacer comprises only a bar body fixed to the sensor portion perpendicularly to the sensor portion, and the sensor portions having the spacers are installed at plural places different each other.

According to the lead-acid storage battery with life indicator, the occurrences of growth at various places can be detected, and information based on them can be obtained.

A lead-acid storage battery with life indicator is so composed that the life indicator has a spacer between the sensor portion and the positive plate, the spacer is adapted to apply a pressure on the sensor portion on receipt of the elongation of the positive plate, the spacer comprises a sheet body mounted on a group of positive and negative plates and a bar body fixed to the sensor portion perpendicularly to the sensor portion, the sensor portions and the bar bodies are installed on different plural places in pairs, and lengths of the bar bodies are different each other.

According to the lead-acid storage battery with life indicator, the detection at sensor portion is carried out in an order from a longer bar body to a shorter one. Therefore, the stage of occurrence of growth can be detected and information based on them can be obtained.

A lead-acid storage battery with life indicator is so composed that the sensor portions are installed at plural places different each other.

According to the lead-acid storage battery with life indicator, the occurrence of growth at voluntary place can be detected.

A lead-acid storage battery with life indicator is so composed that the sensor portion has a resilient pressed part and a pair of electric contacts and is adapted to close the pair of contacts installed with a distance put between them in a pressure applied direction when the pressed part is applied with pressure, the sensor portions are installed at plural places different each other, and each sensor portion is different in a distance of the pair of electric contacts in the pressure applied direction.

According to the lead-acid storage battery with life indicator, the detection at sensor portion is carried out in an order from a shorter distance, in a direction of applying the pressure, between a pair of electric contacts to a longer one. Therefore, the stage of occurrence of growth can be detected and information based on them can be obtained.

A lead-acid storage battery with life indicator is so composed that the sensor portion has a resilient pressed part and a pair of electric contacts and is adapted to close or open the pair of electric contacts when the pressed part is applied with pressure, the sensor portions are installed at plural places different each other, and each sensor portion is different in a resilient force of the pressed part.

A lead-acid storage battery with life indicator is so composed, that the life indicator has a spacer between the sensor portion and the positive plate, the spacer is adapted to apply a pressure on the sensor portion on receipt of the elongation of the positive plate, the spacer has at least a bar body fixed to the sensor portion perpendicularly to the sensor portion, and the sensor portions and the bar bodies are installed on plural places different each other in pairs, and lengths of the bar bodies are different each other. Here, the "large" elastic force means that the bar body is apt to be bent or shrunk as compared with "small" elastic force.

According to the lead-acid storage battery with life indicator, the detection at sensor portion is carried out in an order from a larger resilient force of the pressed portion to a smaller one, or from a smaller resilient force of the bar body to a larger one. Therefore, the stage of occurrence of growth can be detected and information based on them can be obtained.

DETAILED DESCRIPTION OF THE PREFERRED EMBODIMENT

Embodiment 1

Figure 1:
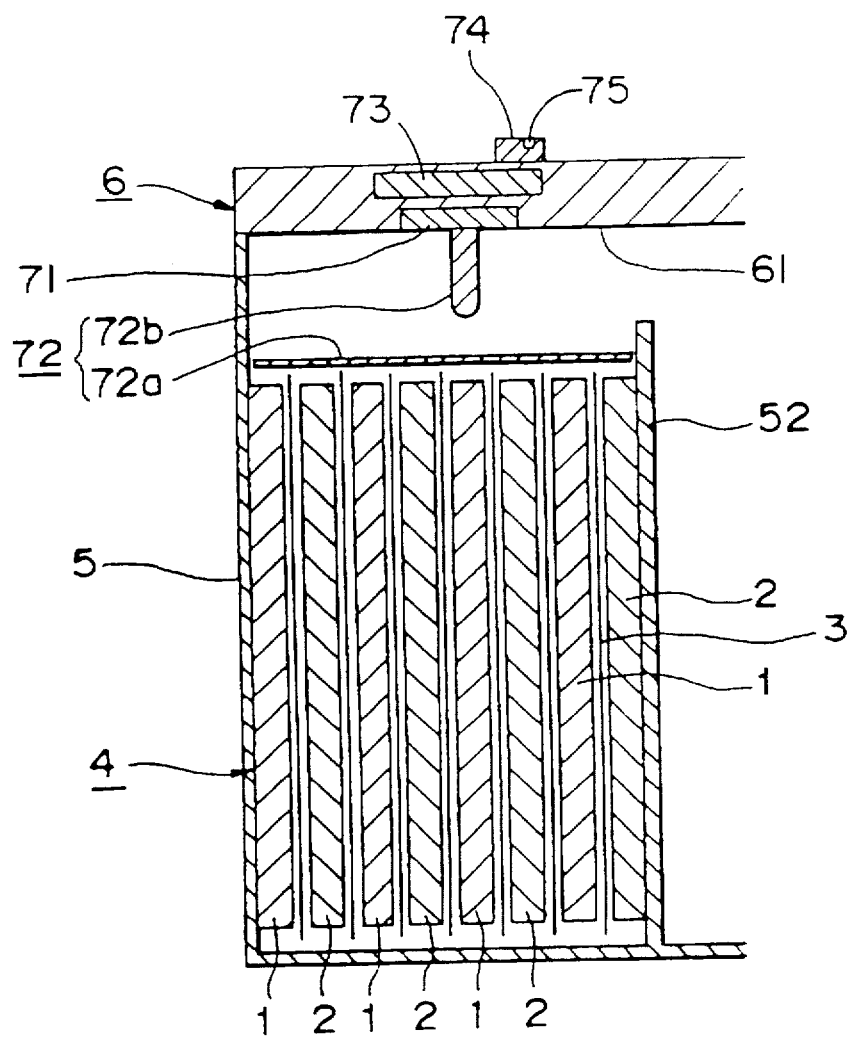
FIG. 1 is a vertical sectional partial view showing the lead-acid storage battery with life indicator of embodiment 1.

FIG. 1 is a vertical sectional partial view showing a first example of a lead-acid storage battery with life indicator.

This lead-acid storage battery has a first example of life indicator. In the figure, 1 is a positive plate, 2 is a negative plate, 3 is a separator, 4 is a group of positive and negative plates, 5 is a container, 6 is a cover and 52 is a partition wall. The life indicator of this embodiment comprises one sensor portion 71, one spacer 72, one sending circuit (sending means) 73, one receiving circuit (receiving means) 74 and one light emitting diode (indicator means) 75. The spacer 72 comprises one sheet body 72a and one bar body 72b. The bar body 72b is integrally formed on the sensor portion 71 perpendicularly to and downward from the sensor portion 71.

Figure 2:
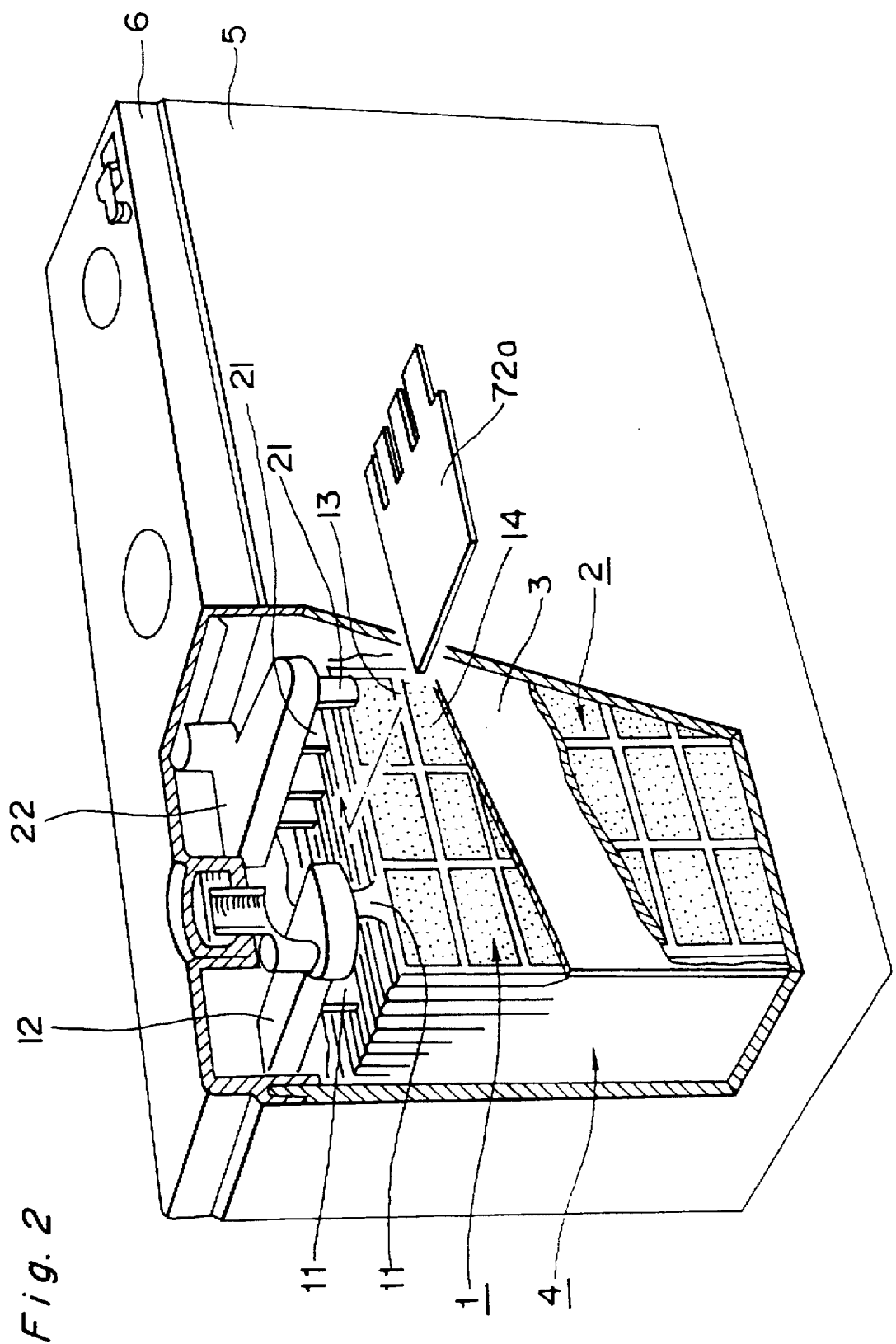
FIG. 2 is a partially fragmental oblique view showing the lead-acid storage battery with life indicator of embodiment 1.

The sheet body 72a is so installed as illustrated in FIG. 2 which is a partially fragmental oblique view of the lead-acid storage battery. Namely, the sheet body 72a is placed on the group of positive and negative plates 4 so as to cover a lower part of the negative strap 22 and a part between the positive strap 12 and the negative strap 22, among an upper face of the group of positive and negative plates 4.

Figure 3:
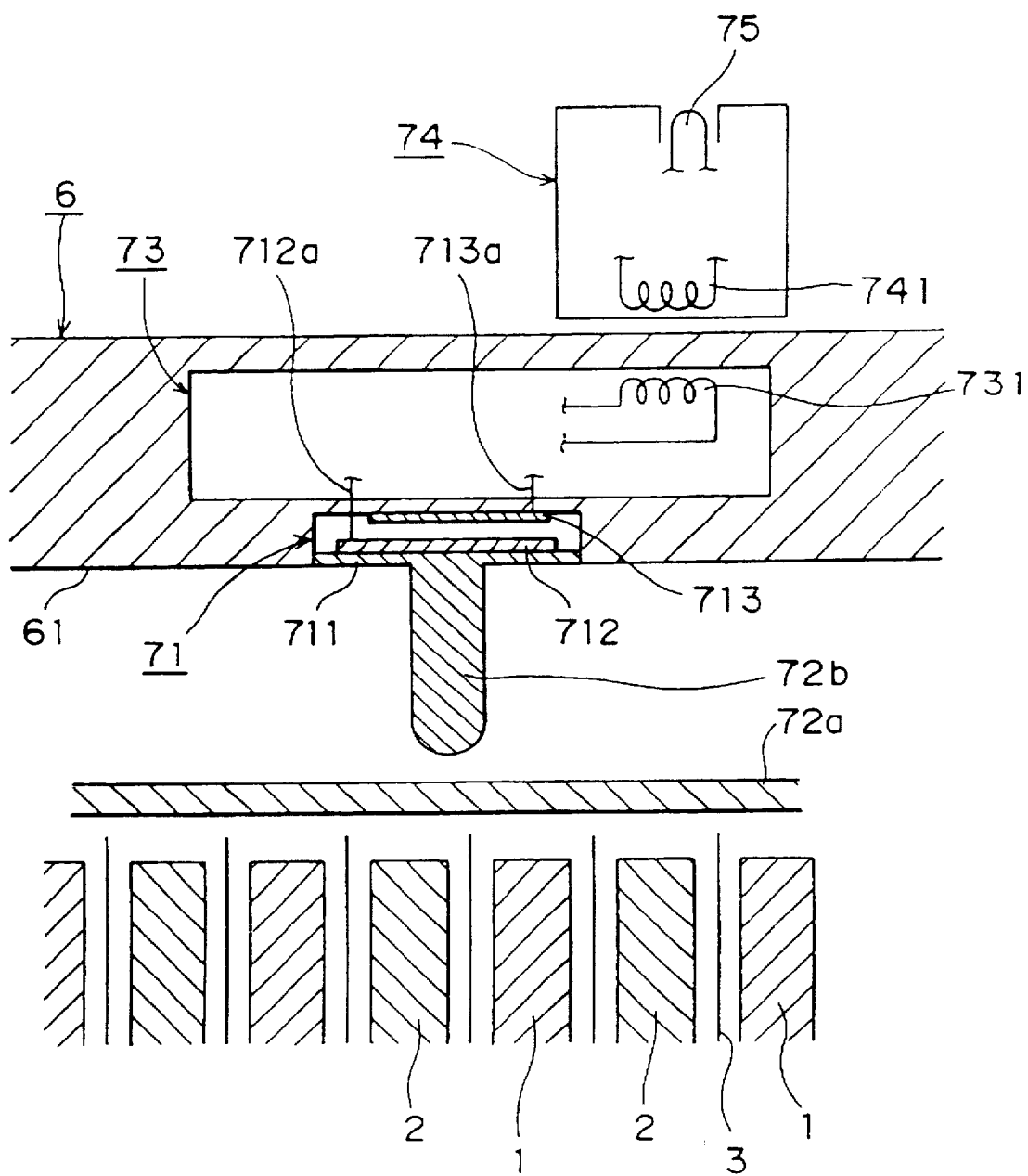
FIG. 3 is an enlarged partial view of the life indicator of embodiment 1.

FIG. 3 is an enlarged partial view of the life indicator of FIG. 1.

The sensor portion 71 is buried in a lower face 61 of the cover 6. The sensor portion 71 has a thin pressed sheet 711 comprising ABS resin and a pair of electric contacts 712 & 713. The pressed sheet 711 is installed flush with the lower face 61. The bar body 72b is formed integrally with the pressed sheet 711. The electric contacts 712 & 713 are made of a conductive sheet i.e. a copper foil sheet. The electric contact 712 is stuck onto an upper face of the pressed sheet 711, and the electric contact 713 is installed fronting on the electric contact 712 with a distance left between them at its upper part. Lead wires 712a & 713a are connected to the electric contacts 712 & 713 respectively. Here, the pressed sheet 711 isolates the electric contacts 712 & 713 from an inside of the container 5.

The sending circuit 73 is installed inside the cover 6 and connected to the lead wires 712a & 713a. The receiving circuit 74 is installed on an outside face 62 of the cover 6 and fronting on the sending circuit 73. The light emitting diode 75 is installed at a position viewable from outside of the receiving circuit 74.

Figure 4:
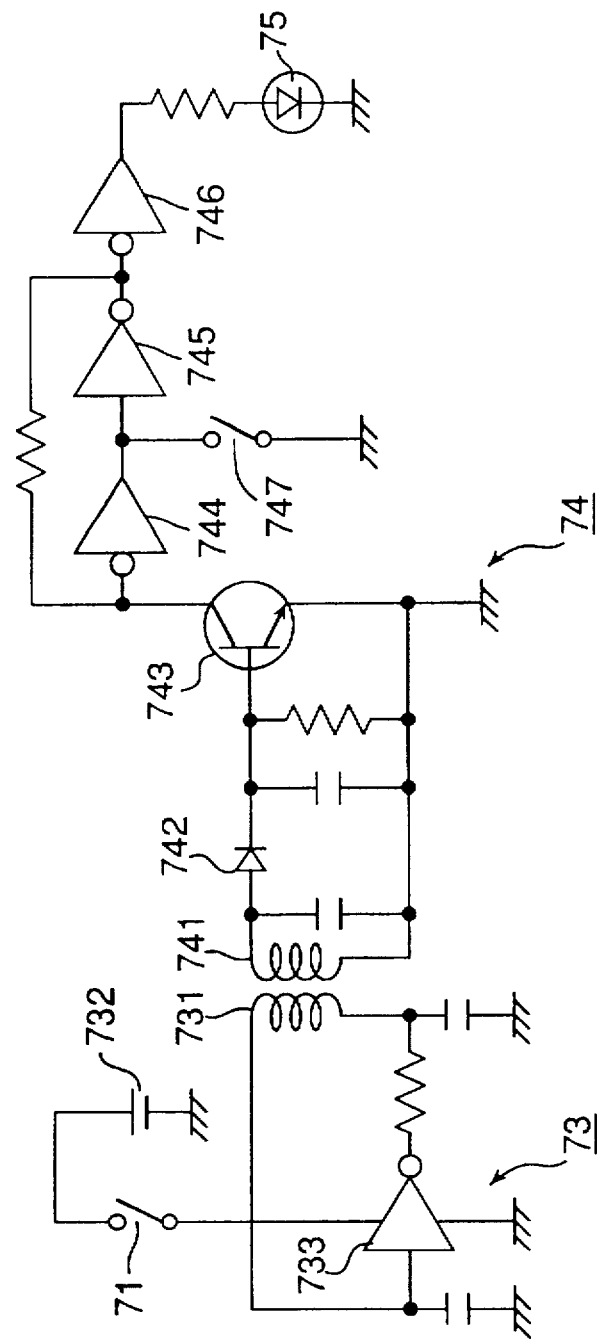
FIG. 4 is a diagram showing a circuit composition of the sending circuit and the receiving circuit for the life indicator of embodiment 1.

The sending circuit 73 and the receiving circuit 74 have a circuit composition shown in FIG. 4 and are so constructed as to work as follows. In the sending circuit 73, when the sensor portion 71 is closed, an electric power of a lithium battery 732 is supplied to a gate 733 so that the gate 733 oscillates, and an electric power of this oscillation causes an electric current to flow in a primary coil 731. In the receiving circuit 74, an induction current flows in a secondary coil 741 caused by electromagnetic induction with the primary coil 731, this current is demodulated by a diode 742, a transistor 743 is brought in continuity state by the output, and an output of gate 745 of a latch circuit comprising gates 744 & 745 becomes low. An output of the gate 746 becomes high on receipt of that state so as to light the light emitting diode 75. The output of the gate 745 of latch gate is forcibly kept at high by instantaneously closing a switch 747 before being put in service. The primary coil 731 and the secondary coil 741 are under non-contact state.

The bar body 72b of the spacer 72 is formed into a cylindrical shape having a spherical bottom end and made of butyl rubber. The bar body 72b is positioned at a part between the positive strap 12 and the negative strap 22.

The life indicator functions as follows.

Figure 5:
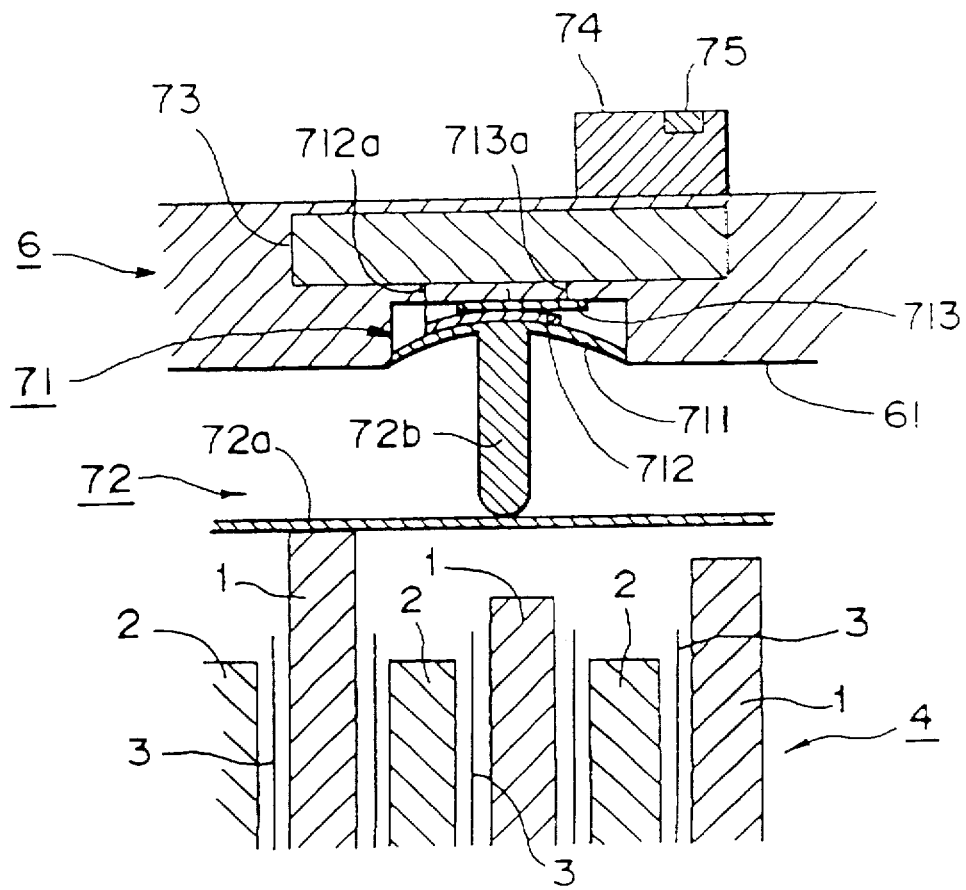
FIG. 5 is a vertical sectional partial view showing a function of the life indicator of embodiment 1.

When charge/discharge operations are repeated and an excessively charged state lasts long, the lattice body 13 of the positive plate 1 is corroded to create the growth. When the growth occurs on the positive plate 1, the sheet body 72a moves upward keeping its roughly horizontal position as it is, the sheet body 72a contacts with lower end of the bar body 72b and the bar body 72b is pushed upward, as shown in FIG. 5. Thereby, the pressed sheet 711 is applied with an upward pressure. Since the pressed sheet 711 is a thin sheet made of ABS resin, it is gradually deformed so as to become convex upward when applied a pressure from the bar body 72b, and the electric contact 712 is also deformed so as to become convex upward according to the above deformation. Then, the electric contact 712 comes in contact with the electric contact 713. This causes the sensor portion 71 to close, the sending circuit 73 and the receiving circuit 74 function, and the light emitting diode 75 is lit to detect the contacting state of the electric contacts 712 & 713. Namely, the life indicator detects the upward movement of the sheet body 72a. Since the sheet body 72a moves with the occurrence of growth, the life indicator detects the occurrence of growth. In this case, the sensor portion 71 detects the occurrence of growth as a creation of electric signal, so that a change of electric parameter detected by the sensor portion 71 is the creation of electric signal.

There is a limit value where troubles such as a short-circuiting, a decrease in air-tightness of the cover 6 and a breakage of the container 5 etc. arise to exhaust a life of the lead-acid storage battery if the limit is exceeded. Accordingly, when a largeness of the growth detected by the life indicator is set to this value, the life of the lead-acid storage battery can be detected securely. When a largeness of the growth detected by the life indicator is set to a value by which a remaining life can be estimated, it becomes possible to carry out preparation for exchange work etc. after exhaustion of life with sufficient time by utilizing a time until the life is exhausted.

In the sending circuit 73, an external power source may be used in place of the lithium battery 732. In this case, an electric power sending coil is installed in the external power source and an electric power receiving coil is installed in the sending circuit 73, so that the electric power can be supplied by electromagnetic induction in a non-contact method. According to this method, an electric power consumption can be reduced because it becomes possible to supply the electric power only when required.

Further, the sending circuit and the receiving circuit transmitting the electric signal by the electromagnetic induction are installed in this embodiment. However, when a sending circuit and a receiving circuit which can transmit the electric signal to a remote district are installed in place of the above, a practical convenience can be improved.

Figure 6:
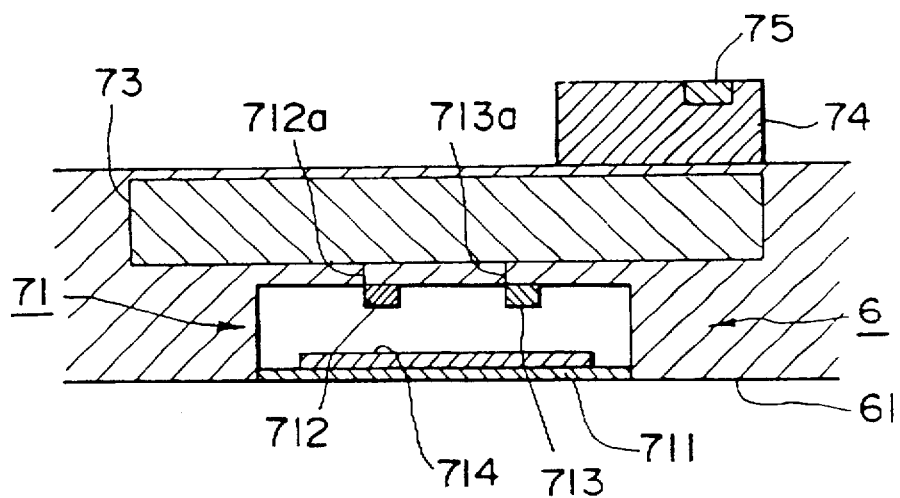
FIG. 6 is a vertical sectional partial view showing the life indicator of embodiment 2.

Embodiment 2:

FIG. 6 is a vertical sectional partial view showing a second example of the life indicator, and shows the sensor portion 71. In this sensor portion 71, spot-like electric contacts 712 & 713 are installed fronting on the pressed sheet 711 with a distance left between them, and a conductive sheet 714 comprising a copper foil sheet is stuck to an upper face of the pressed sheet 711. Here, the sensor portion 71 not having the bar body 72b is shown.

Figure 7:
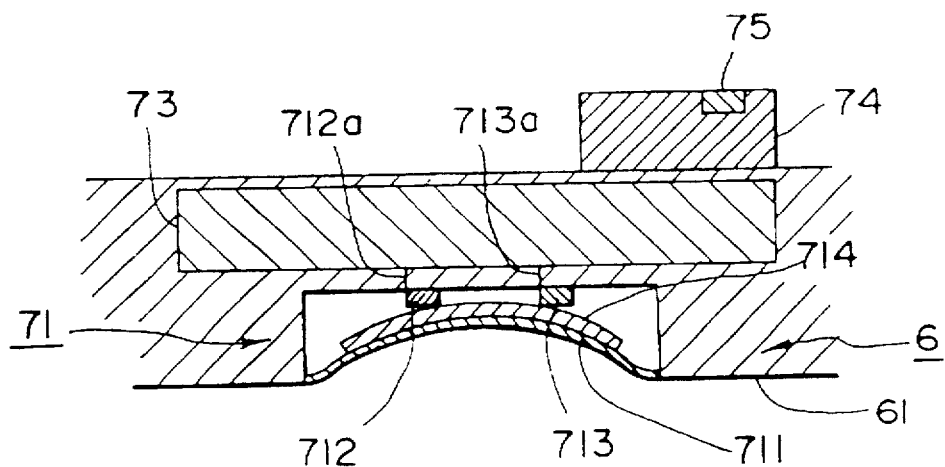
FIG. 7 is a vertical sectional view showing a function of the life indicator of embodiment 2.

In this sensor portion 71, the pressed sheet 711 is deformed together with the conductive sheet 714 so as to be convex upward when the growth occurs to press the pressed sheet 711, as shown in FIG. 7. Then, the conductive sheet 714 becomes contact with the electric contacts 712 & 713 to make continuity between the electric contacts 712 & 713. Thereby, the creation of electric signal is detected to afford the same function and effect as that of the life indicator of embodiment 1.

Figure 8:
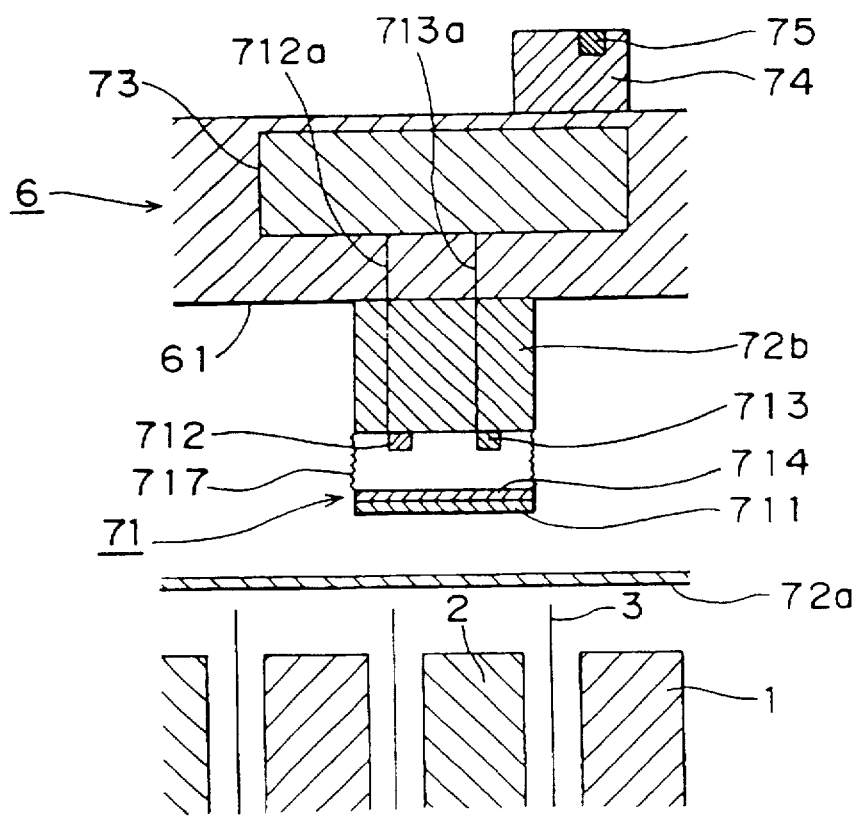
FIG. 8 is a vertical sectional view showing the life indicator of embodiment 3.

Embodiment 3:

FIG. 8 is a vertical sectional view showing a third example of the life indicator. A fundamental structure of this sensor portion 71 is similar to that of the embodiment 2. However, the spot-like electric contacts 712 & 713 are installed on a tip end face of the bar body 72b secured perpendicularly to an inside face 61 of the cover 6, and the pressed sheet 711 and the conductive sheet 714 are installed through a compression member 717 at a tip end side of the bar body 72b fronting on the electric contacts 712 & 713 and apart from the electric contacts 712 & 713.

Figure 9:
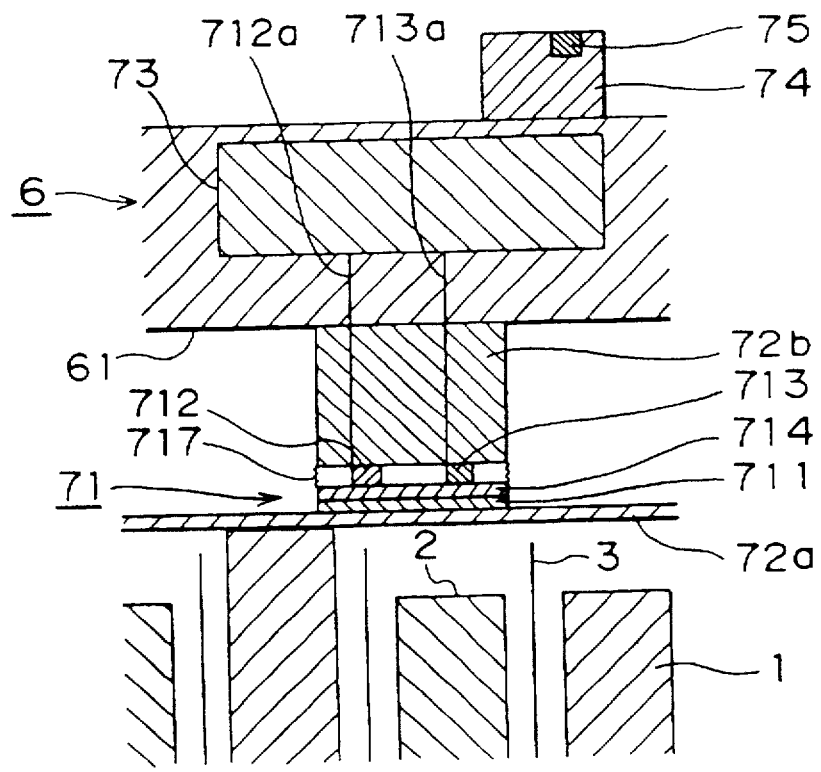
FIG. 9 is a vertical sectional view showing a function of the life indicator of embodiment 3.

In this sensor portion 71, the sheet body 72a is moved upward when the growth occurs, and the pressed sheet 711 and the conductive sheet 714 are pushed upward while shrinking the compression member 717 as shown in FIG. 9, so that continuity is made between the electric contacts 712 & 713 through the conductive sheet 714. Thereby, the creation of electric signal is detected to afford the same function and effect as the life indicator of embodiment 1.

Figure 10:
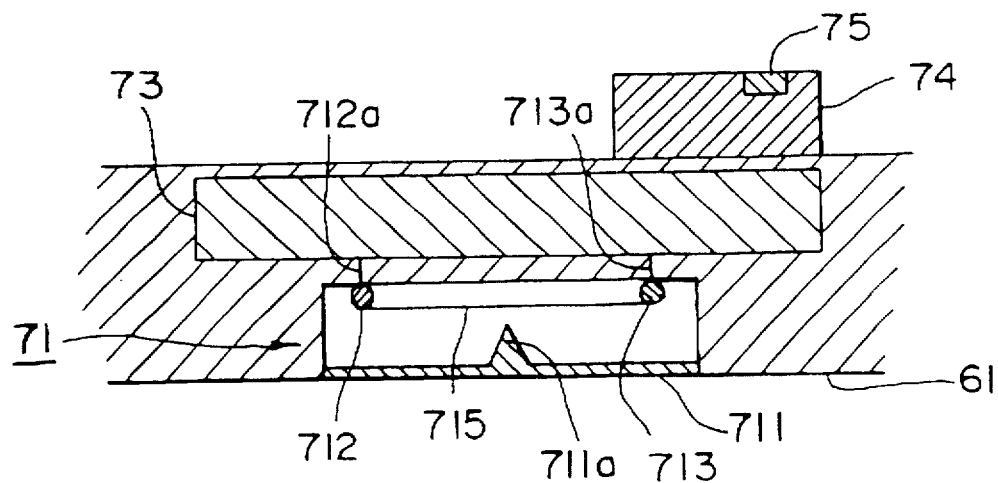
FIG. 10 is a vertical sectional partial view showing the life indicator of embodiment 4.

Embodiment 4:

FIG. 10 is a vertical sectional partial view showing a fourth example of the life indicator, and shows the sensor portion 71. Here, the sensor portion 71 not having the bar body 72b is shown. In this sensor portion 71, spot-like electric contacts 712 & 713 are installed fronting on the pressed sheet 711 with a distance left between them, and continuity is made between the electric contacts 712 & 713 by a tensely fitted conductive sheet 715. While, a pin-pointed projecting portion 711a is formed at upper central part of the pressed sheet 711. The conductive sheet 715 has a strength to an extent that it is easily broken when a pressure is given from the tip of the projecting portion 711a.

Figure 11:
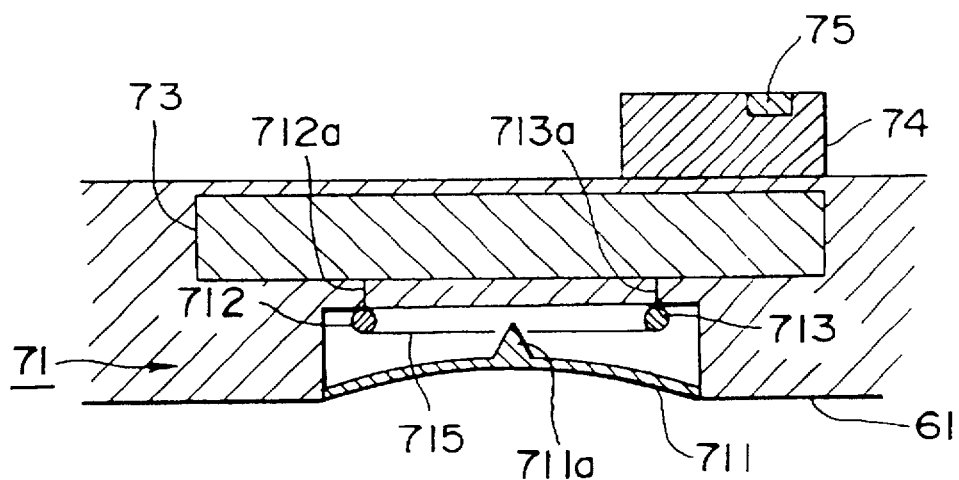
FIG. 11 is a vertical sectional partial view showing a function of the life indicator of embodiment 4.

In this sensor portion 71, when the growth occurs and the pressed sheet 711 is applied with pressure, the tip end of the projecting portion 711a applies a pressure on the conductive sheet 715 as the pressed sheet 711 is deformed so as to be convex upward and the conductive sheet 715 is broken, as shown in FIG. 11. Thereby, continuity is broken between the electric contacts 712 & 713 so that a cut-off of electric signal is detected. In this case, the sensor portion 71 detects the occurrence of growth as the cut-off of electric signal, and the change of electric parameter detected by the sensor portion 71 is the cut-off of electric signal.

Figure 12:
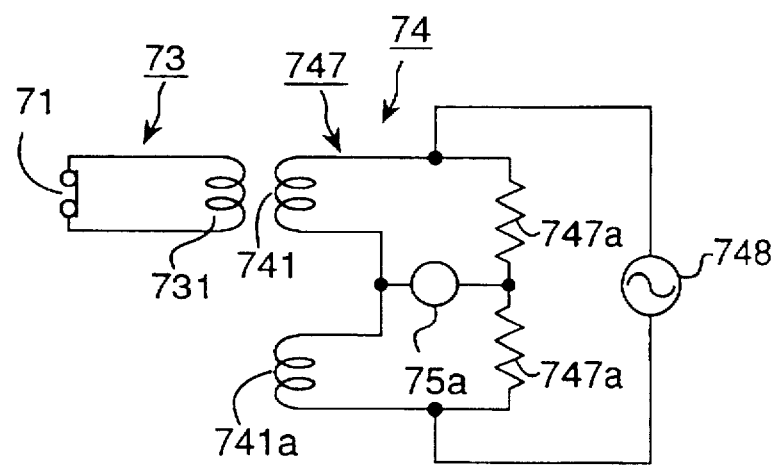
FIG. 12 is a diagram showing a circuit composition of the sending circuit and the receiving circuit for the life indicator of embodiment 4.

FIG. 12 shows the sending circuit 73, the receiving circuit 74 and a high-frequency meter (indicator means) 75a for zero-detection, for use in this embodiment. The sending circuit 73 has a primary coil 731 and is adapted to be in open-state when the sensor portion 71 detects the cut-off of electric signal. The receiving circuit 74 has a bridge circuit 747 and a high-frequency oscillator 748 and is adapted to recover from a state wherein a balance of the bridge circuit 747 is destroyed, when the sending circuit 73 turns from closed state to open state. The bridge circuit 747 is composed of a secondary coil 741, a dummy coil 741a and two resistors 747a.

The balance of the bridge circuit 747 is destroyed when the sending circuit 73 is in the closed state and the high-frequency meter 75a does not indicate zero when a high frequency is applied. However, since the sending circuit 73 comes to open-state and the bridge circuit 747 comes to balanced state when the electric signal is cut off in the sensor portion 71, the high-frequency meter 75a indicates zero when the high frequency is applied. Namely, the occurrence of growth is detected by the high-frequency meter 75a showing zero. Here, the high-frequency meter 75a is so set as to indicate zero when the bridge circuit 747 keeps the balanced state in this case. However, the setting is not limited to this. In other words, the high-frequency meter 75a may be set only to indicate a fluctuation of balance of the bridge circuit 747.

Figure 13:
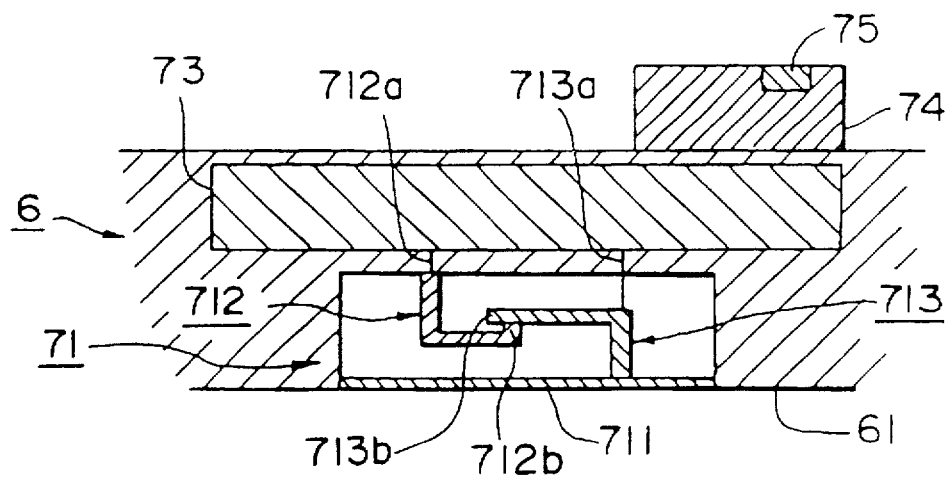
FIG. 13 is a vertical sectional partial view showing the life indicator of embodiment 5.
Figure 14:
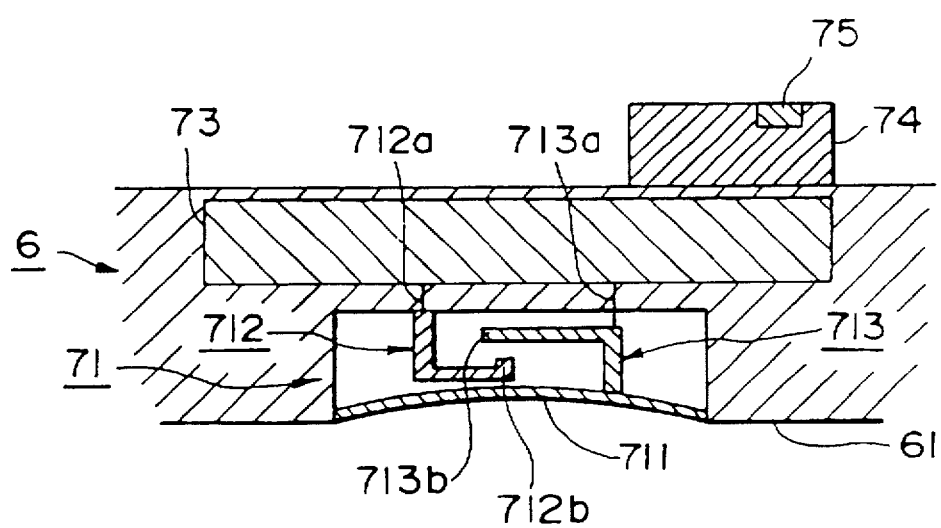
FIG. 14 is a vertical sectional partial view showing a function of the life indicator of embodiment 5.

Embodiment 5:

FIG. 13 is a vertical sectional partial view showing a fifth example of the life indicator, and shows the sensor portion 71. Here, the sensor portion 71 not having the bar body 72b is shown. In this sensor portion 71, the electric contact 712 located at a side fronting on the pressed sheet 711 extends downward into an L-shape with its tip end 712b bent to be extended upward a little, and the electric contact 713 located at a side of the pressed sheet 711 extends upward into an L-shape. The electric contacts 712 & 713 contact each other at the tip end 712b and a tip end 713b of the electric contact 713 under a state where the pressed sheet 711 is not applied with pressure. When the pressed sheet 711 is applied with pressure, the tip end 712b is separated from the tip end 713b as shown in FIG. 14. Other structures are same as those of the embodiment 4.

In this sensor portion 71, when the growth occurs and the pressed sheet 711 is applied with pressure, the electric contacts 712 & 713 in contact each other comes to non-contact state and the cut-off of electric signal is detected, so that the function and effect same as that of the life indicator of embodiment 4 can be obtained.

Figure 15:
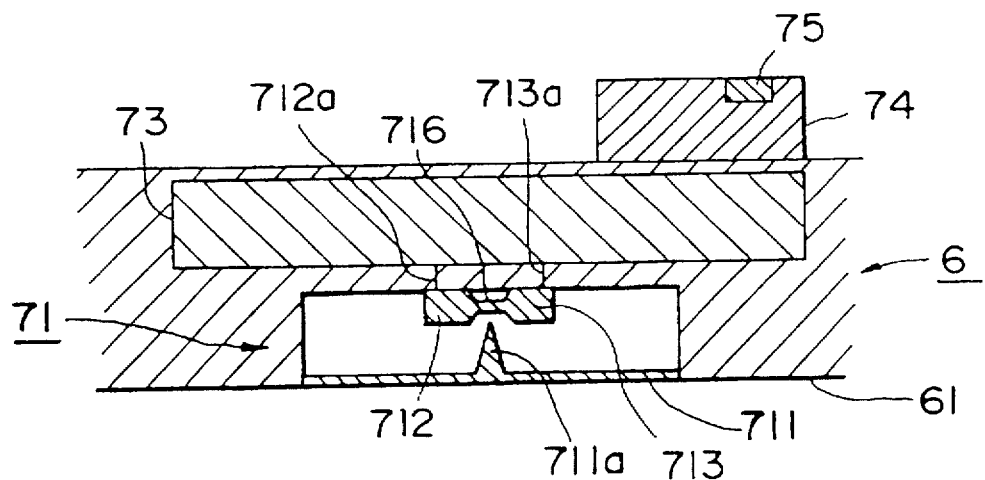
FIG. 15 is a vertical sectional partial view showing the life indicator of embodiment 6.

Embodiment 6:

FIG. 15 is a vertical sectional partial view showing a sixth example of the life indicator, and shows the sensor portion 71. Here, the sensor portion 71 not having the bar body 72b is shown. In this sensor portion 71, the electric contacts 712 & 713 are integrally formed through a thin portion 716 at a side fronting on the pressed sheet 711. While, a pin-pointed projecting portion 711a is formed at upper face central part of the pressed sheet 711. The thin portion 716 has a strength to an extent that it is easily broken when a pressure is applied from the tip of the projecting portion 711a. Other structures are same as those of the embodiment 4.

Figure 16:
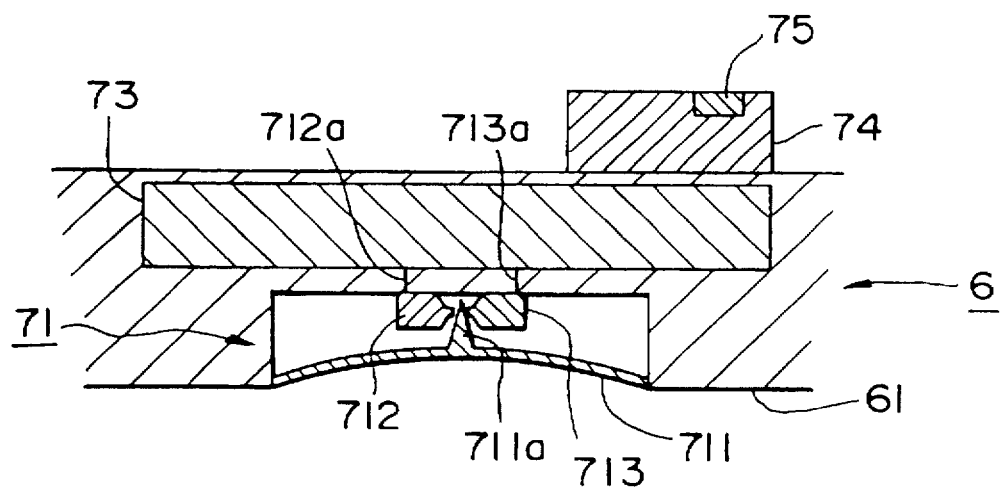
FIG. 16 is a vertical sectional partial view showing a function of the life indicator of embodiment 6.

In this sensor portion 71, when the growth occurs and the pressed sheet 711 is applied with pressure, the tip end of the projecting portion 711a applies a pressure on the thin portion 716 as the pressed sheet 711 is deformed so as to be convex upward and the thin portion 716 is broken, as shown in FIG. 16. Thereby, continuity is broken between the electric contacts 712 & 713 so that cut-off of electric signal is detected, so that the function and effect same as that of the life indicator of embodiment 4 can be obtained.

Figure 17:
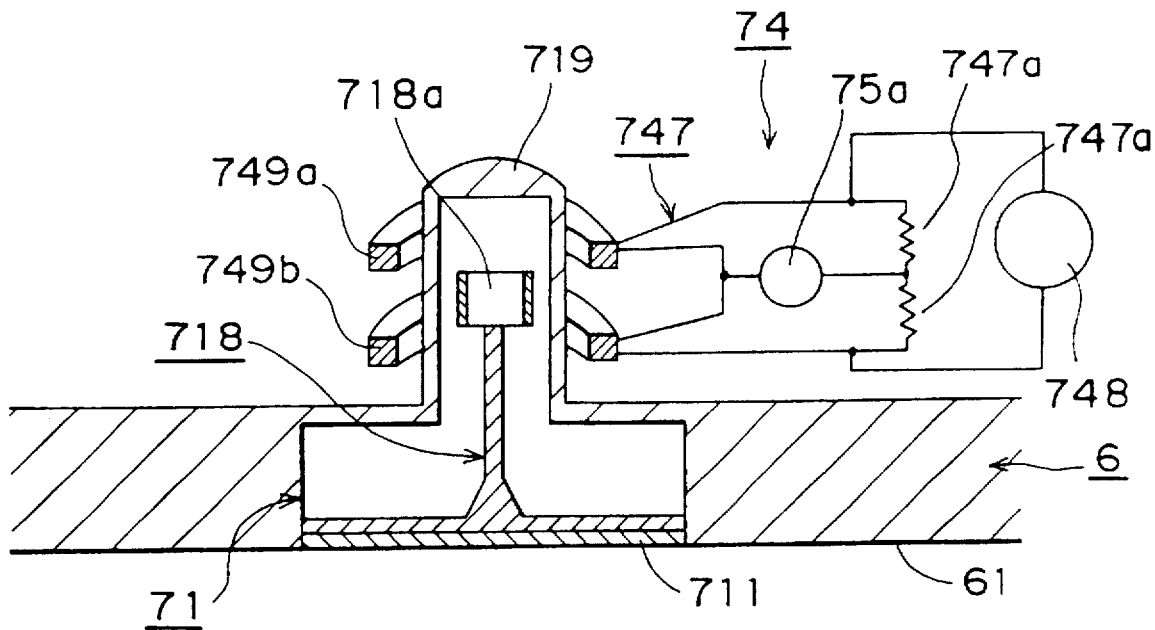
FIG. 17 is a vertical sectional view showing the life indicator of embodiment 7.

Embodiment 7:

FIG. 17 is a vertical sectional partial view showing a seventh example of the life indicator. Here, the sensor portion 71 not having the bar body 72b is shown. In this embodiment, a magnetic core 718a and two detecting coils 749a & 749b are installed in place of the primary coil 731, the secondary coil 741 and the dummy coil 741a of embodiment 4. The magnetic core 718a is supported at an upper end of a stand 718 secured to an upper face of the pressed sheet 711 and located within a cylindrical body 719. The two detecting coils 749a & 749b are so position ed as to surround the cylindrical body 719, and the magnetic core 718a is positioned at a central part of the two detecting coils 749a & 749b. The cylindrical body 719 protrudes upward from the cover 6. Other structures are same as those of the embodiment 4.

Under a state where the growth does not occur, the bridge circuit 747 maintains the balanced state and the high-frequency meter 75a indicates zero. When the growth occurs and the pressed sheet 711 is applied with pressure, the magnetic core 718a is moved upward, the balance of the bridge circuit 747 is destroyed, and the indication of the high-frequency meter 75a changes from zero. In this instance, since an extent of destroying the balance of the bridge circuit 747 changes continuously, a moving distance of the magnetic core 718a can be detected quantitatively to some extent and an extent of occurrence of the growth can thus be detected. Here, the moving distance of the magnetic core may be detected by utilizing a differential transformer in place of the life indicator of this embodiment 7.

Figure 18:
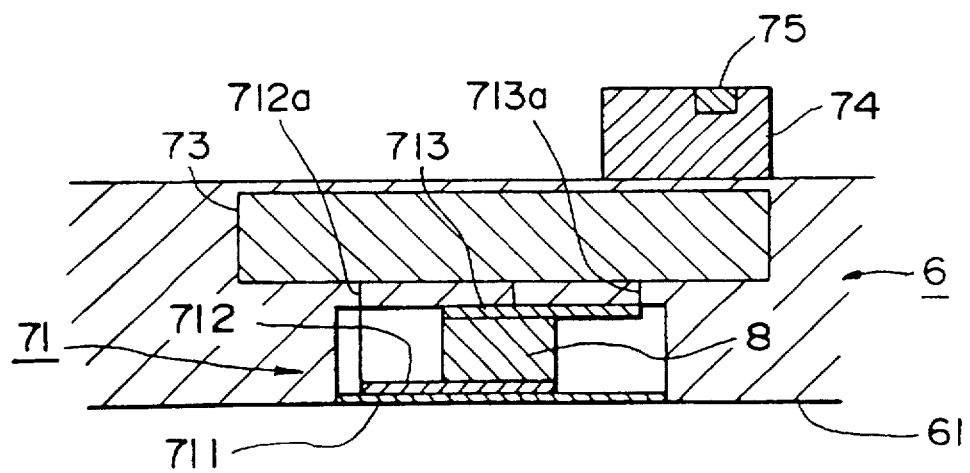
FIG. 18 is a vertical sectional view showing the life indicator of embodiment 8.

Embodiment 8:

FIG. 18 is a vertical sectional partial view showing an eighth example of the life indicator, and shows the sensor portion 71. In this sensor portion 71, a pressure-sensitive conductor 8 connecting the electric contacts 712 & 713 is installed between the contacts in the sensor portion 71 of the embodiment 1 (FIG. 3). The pressure-sensitive conductor 8 is made of acetylene black and styrene-butadiene rubber, and has such a property that its resistance value decreases with an increase in an applied pressure. Here, the sensor portion 71 not having the bar body 72b is shown.

Figure 19:
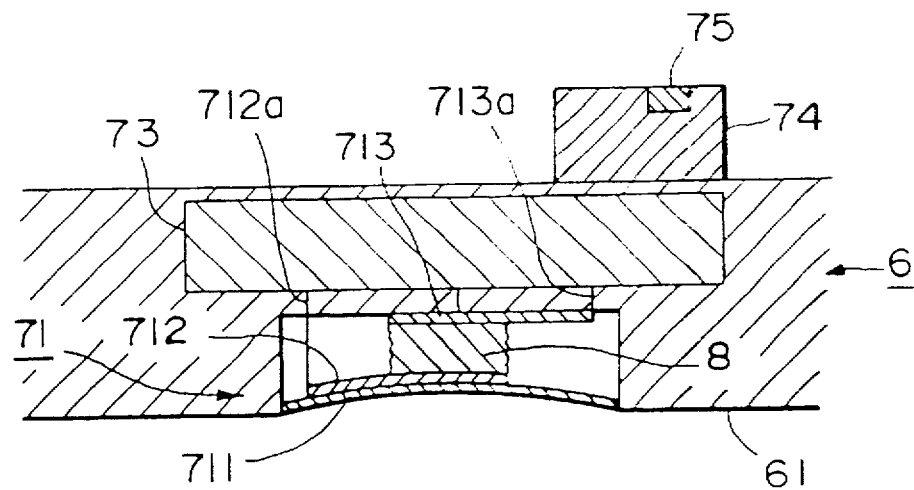
FIG. 19 is a vertical sectional view showing a function of the life indicator of embodiment 8.

In this sensor portion 71, when the growth occurs and the pressed sheet 711 is applied with pressure, the pressure-sensitive conductor 8 is increasingly applied with pressure and the resistance value of the pressure-sensitive conductor 8 lowers as the pressed sheet 711 is deformed so as to be convex upward, as shown in FIG. 19. For this reason, a current flowing between the electric contacts 712 & 713 before applying a pressure on the pressed sheet 711 is apt to flow gradually easily and the electric signal becomes strong. Namely, a change of electric signal is detected according to the life indicator of this embodiment. In this instance, it can be said that the sensor portion 71 detects the occurrence of growth as the change of electric signal. Therefore, the change of electric parameter detected by the sensor portion 71 is the change of electric signal.

Figure 20:
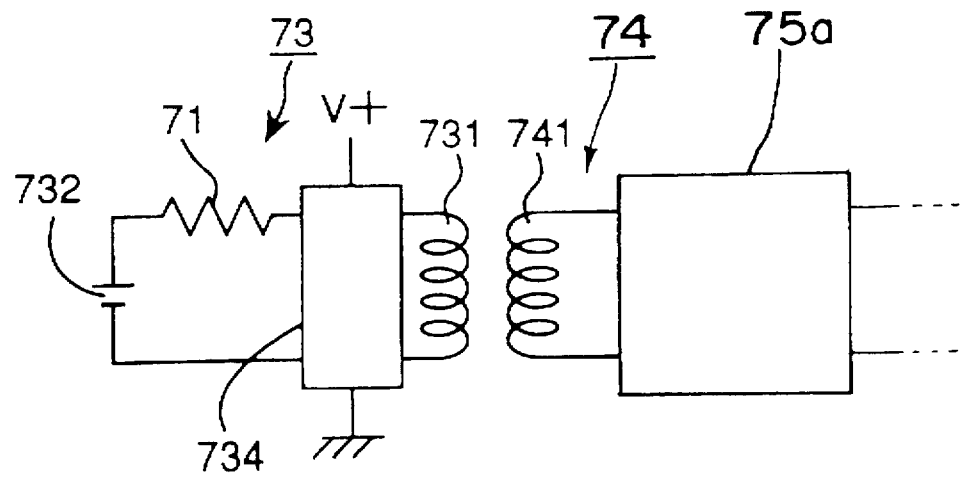
FIG. 20 is a diagram showing a circuit composition of the sending circuit and the receiving circuit for the life indicator of embodiment 8.

FIG. 20 shows the sending circuit 73 and the receiving circuit 74 for use in this embodiment. 734 is a current/frequency converter. In the sending circuit 73, the converter 734 repeats such an operation as to accumulate a current in a condenser and then send one pulse and simultaneously discharge an electric charge when the current has been accumulated to a fixed amount. 75a is an indicator means circuit including the light emitting diode 75, and adapted to make the light emitting diode 75 light for a specified short time on receipt of the pulse signal.

In this embodiment, the light emitting diode 75 in the receiving circuit 74 repeats flickering by the discharge of the condenser 734. As the electric signal detected by the sensor portion 71 becomes strong, an interval of flickering of the light emitting diode 75 becomes short. Namely, as an extent of occurrence of the growth becomes large, the electric signal detected by the sensor portion 71 becomes strong. Consequently, the extent of occurrence of the growth can be detected and indicated in stages because the change of electric signal detected by the sensor portion 71 is sent as the frequency information, in this embodiment.

Figure 21:
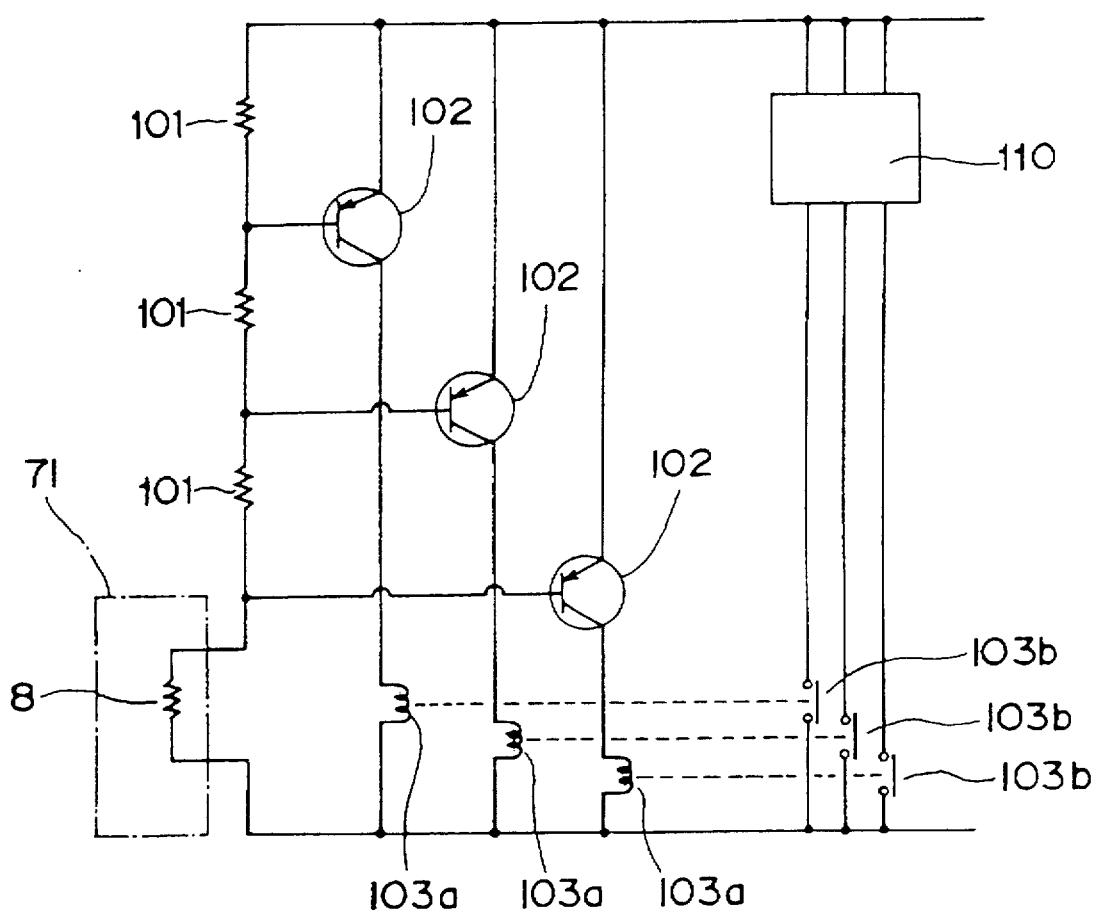
FIG. 21 is a diagram showing an example of electric signal detection circuit usable for the life indicator of embodiment 8.
Figure 22:
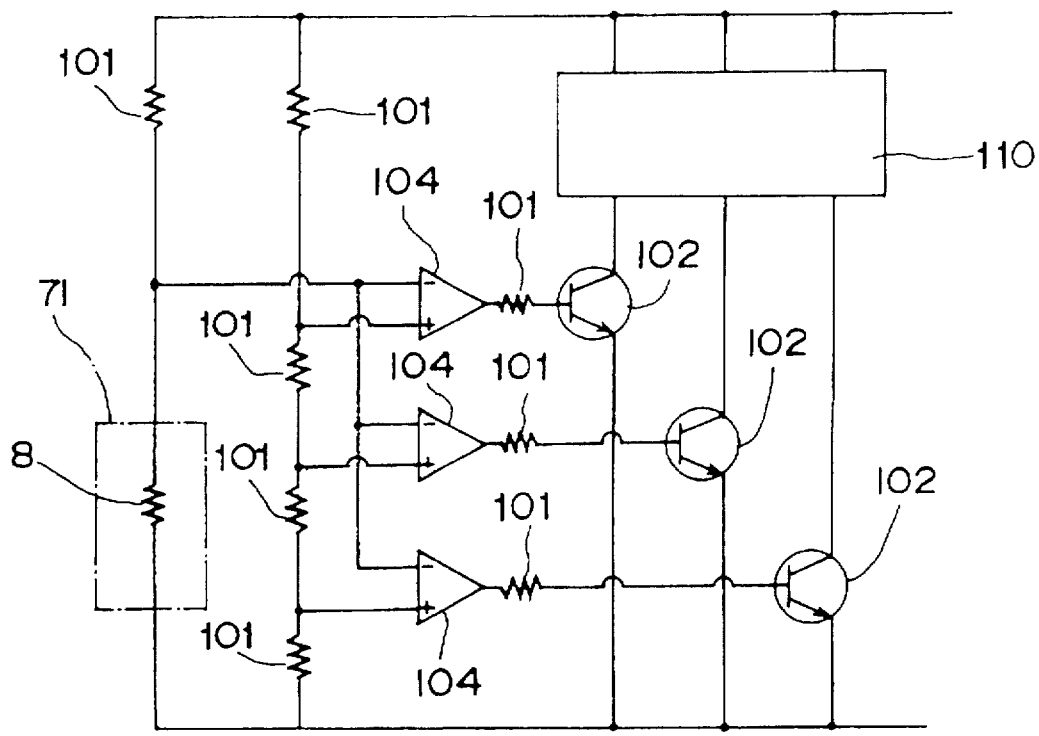
FIG. 22 is a diagram showing another example of electric signal detection circuit usable for the life indicator of embodiment 8.

As an another embodiment, a circuit shown in FIG. 21 or FIG. 22 may be used. Further, a bridge circuit may be used.

FIG. 21 is a diagram showing a circuit for detecting the change of electric signal in three stages. In the figure, 101 is a resistance, 102 is a transistor, 103a is a coil of an electromagnetic relay, 103b is a contact of the electromagnetic relay, and 110 is a controlled circuit. The change of electric signal based on the decrease in resistance value of the pressure-sensitive conductor 8 is detected by this circuit in three stages. Accordingly, it can be said that the extent of growth is detected in three stages, i.e. stepwise, by-this circuit.

In FIG. 22, 101 is a resistance, 102 is a transistor, 104 is a comparator, and 110 is a controlled circuit. It can be said that the extent of growth is detected in three stages, i.e. in stages, even by this circuit in the same way as the circuit of FIG. 21.

The pressure-sensitive conductor 8 is one which is decreased in its resistance value by the applied pressure. However, a pressure-sensitive conductor which is increased in its resistance value by the applied pressure, may be used in place of the above. In addition, (1) a material made of acetylene black and polyvinyl chloride and (2) a material made of particles of conductive metal such as copper or nickel etc. and silicone rubber, etc. may be used for the pressure-sensitive conductor. In place of the pressure-sensitive conductor 8, a material may be used, in which plural sheet-shaped carbons are laminated with clearances put between them so that a resistance value in laminated direction changes according to a pressure applied in the laminated direction.

Figure 23:
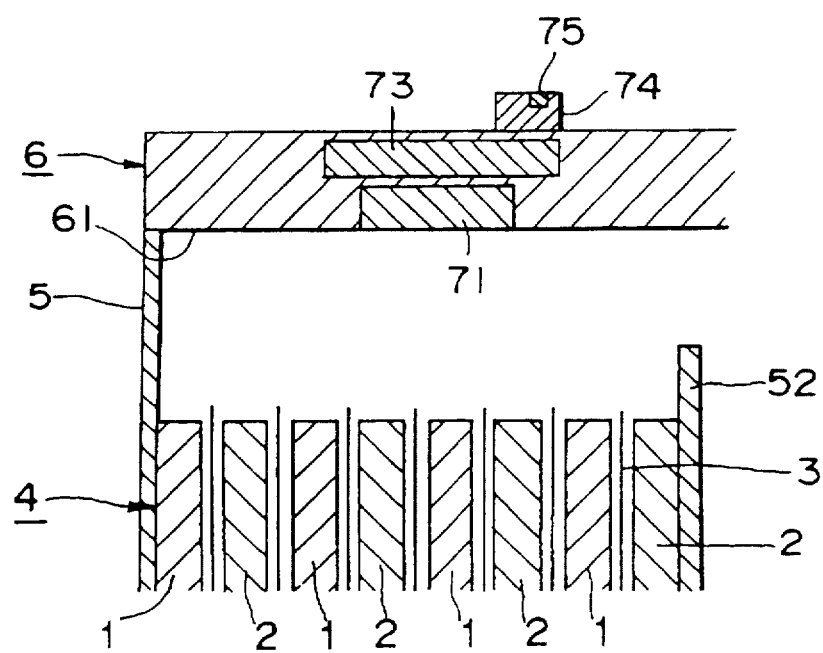
FIG. 23 is a vertical sectional partial view showing the lead-acid storage battery with life indicator of embodiment 9.

Embodiment 9:

FIG. 23 is a vertical sectional partial view showing a second example of the lead-acid storage battery with life indicator. This lead-acid storage battery has a life indicator comprising one sensor portion 71 installed on an inside face 61 of the cover 6, one sending circuit 73, one receiving circuit 74 and one indicator means 75. Anyone of the above-mentioned sensor portions 71 except for that described in the embodiment 7 may be used for this sensor portion 71.

In this lead-acid storage battery, the pressed sheet 711 of the sensor portion 71 is applied with pressure directly by the growth occurring.

In the lead-acid storage battery, there is a fear that the cover 6 is pushed up to impair the air-tightness when the cover 6 is applied with a pressure by the growth strongly. According to the life indicator of this embodiment, however, the occurrence of growth can be detected before the cover 6 is applied with a pressure by the growth strongly. Therefore, the air-tightness can be prevented from being impaired.

Embodiment 10

Figure 24:
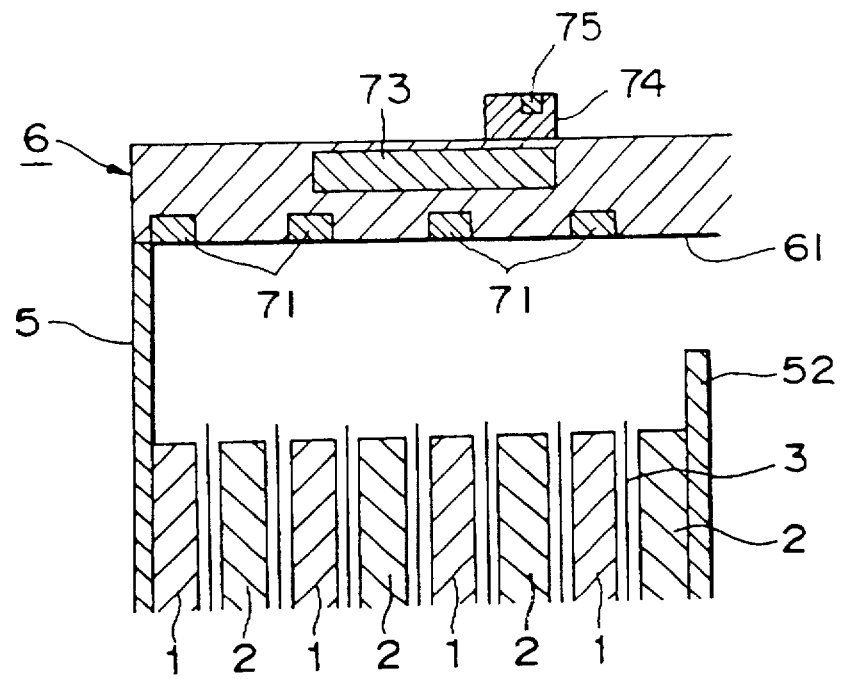
FIG. 24 is a vertical sectional partial view showing the lead-acid storage battery with life indicator of embodiment 10.

FIG. 24 is a vertical sectional partial view showing a third example of the lead-acid storage battery with life indicator. This lead-acid storage battery has a life indicator comprising plural. (four, in this case) sensor portions 71 installed on an inside face 61 of the cover 6, one sending circuit 73, one receiving circuit 74 and one indicator means 75. Anyone of the above-mentioned sensor portions 71 except for that described in the embodiment 7 may be used for this sensor portion 71.

In this lead-acid storage battery, the pressed sheet 711 of each sensor portion 71 is applied with pressure directly by the growth occurring at the positive plate 1 positioned at lower part of each sensor portion 71.

In the lead-acid storage battery, the occurrence of growth in each positive plate 1 is not necessarily uniform and there may be a case where a growth of particular positive plate 1 is extremely ac to push up the cover 6. According to the life indicator of this embodiment, however, occurrences of growth in many positive plates 1 can be detected. Therefore, a possibility of overlooking a local occurrence of growth is minimized and the impairing of air-tightness due to the pushed-up cover 6 by local growth is prevented.

Figure 25:
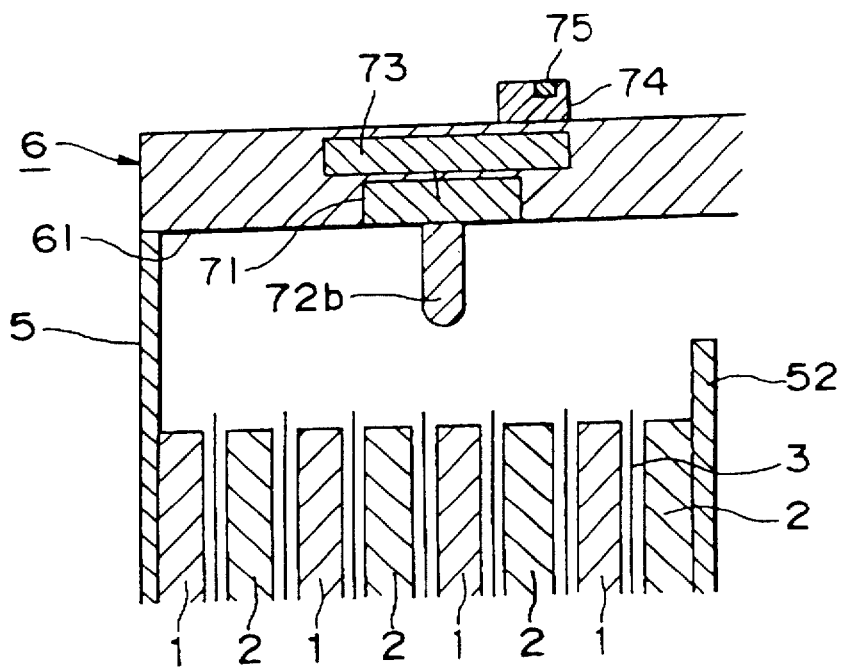
FIG. 25 is a vertical sectional partial view showing the lead-acid storage battery with life indicator of embodiment 11.

Embodiment 11:

FIG. 25 is a vertical sectional partial view of fourth example of the lead-acid storage battery with life indicator. This life indicator is different from that of the embodiment 9 (FIG. 23) only in a point that the bar body 72b is formed integrally with the sensor portion 71.

In this lead-acid storage battery, the pressed sheet 711 of the sensor portion 71 is applied with a pressure by the bar body 72b applied with a pressure directly by the growth occurring.

Figure 26:
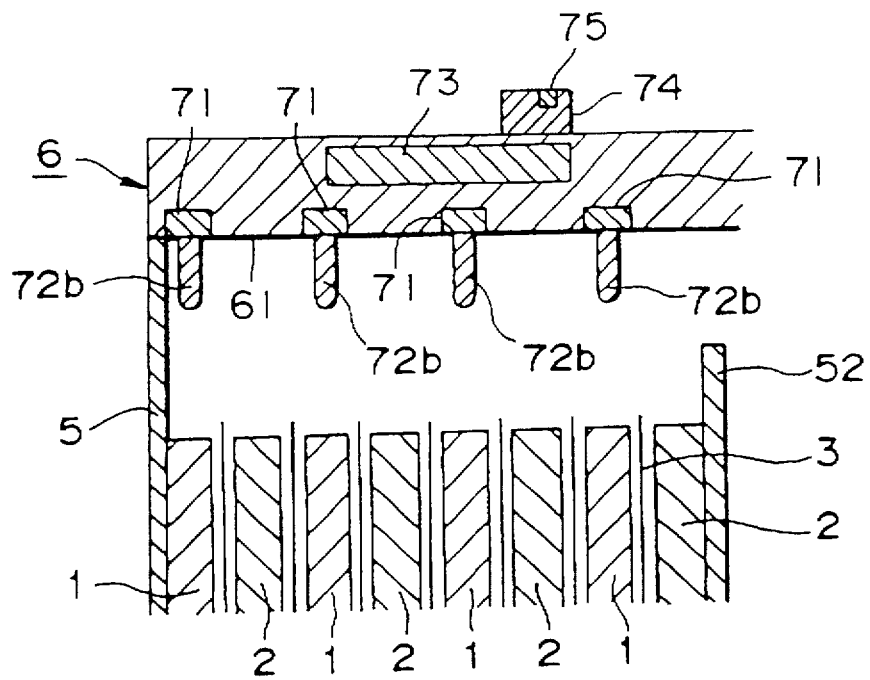
FIG. 26 is a vertical sectional partial view showing the lead-acid storage battery with life indicator of embodiment 12.

The same function and effect as that of the embodiment 9 is obtainable even by the life indicator of this embodiment.
Embodiment 12:

FIG. 26 is a vertical sectional partial view of fifth example of the lead-acid storage battery with life indicator. This life indicator is different from that of the embodiment 10 (FIG. 24) only in a point that the bar body 72b is formed integrally with the sensor portion 71.

In this lead-acid storage battery, the pressed sheet 711 of each sensor portion 7 is pressed by the bar body 72b receiving a pressure, which is produced by the positive plate 1 located at the lower art of each sensor portion 71, directly from the growth.

The same function an effect as that of the embodiment 10 is obtainable even by the life indicator of this embodiment.
Embodiment 13

Figure 27:
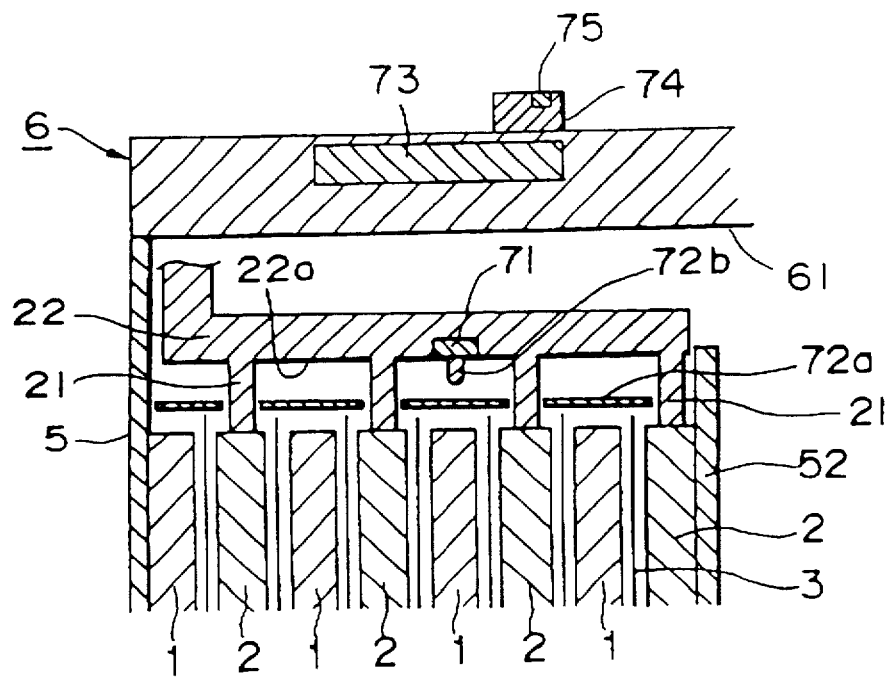
FIG. 27 is a vertical sectional partial view showing the lead-acid storage battery with life indicator of embodiment 13.

FIG. 27 is a vertical sectional partial view of sixth example of the lead-acid storage battery with life indicator. This life indicator comprises one sensor portion 71 fitted to a lower face 22a of the negative strap 22, a spacer 72 consisting of one sheet body 72a and one bar body 72b, one sending circuit 73 installed in inside of the cover 6, and one receiving circuit 74 and one indicator means 75 installed on an outside face of the cover 6. Anyone of the above-mentioned sensor portions 71 except for that of the embodiment 7 may be used for this sensor portion 71. The sensor portion 71 is so fitted to the lower face 22a of the negative strap 22 that the pressed sheet 711 is flush with the lower face 22a. The sheet body 72a is same with the sheet body 72a shown in FIG. 2. The bar body 72b is installed integrally with the sensor portion 71 perpendicularly to and downward from the sensor portion 71. The sending circuit 73 is installed in inside of a side wall of the container 5, and the receiving circuit 74 and the indicator means 75 are installed on the outside face of the side wall of the container 5.

In this lead-acid storage battery, when the growth occurs on the positive plate 1 located at lower part of the negative strap 22, the sheet body 72a is pushed up to be in contact with the bar body 72b, the pressed sheet 711 of the sensor portion 71 is applied with pressure by the bar body 72b, and the change of electric parameter is detected by the sensor portion 71.

Figure 28:
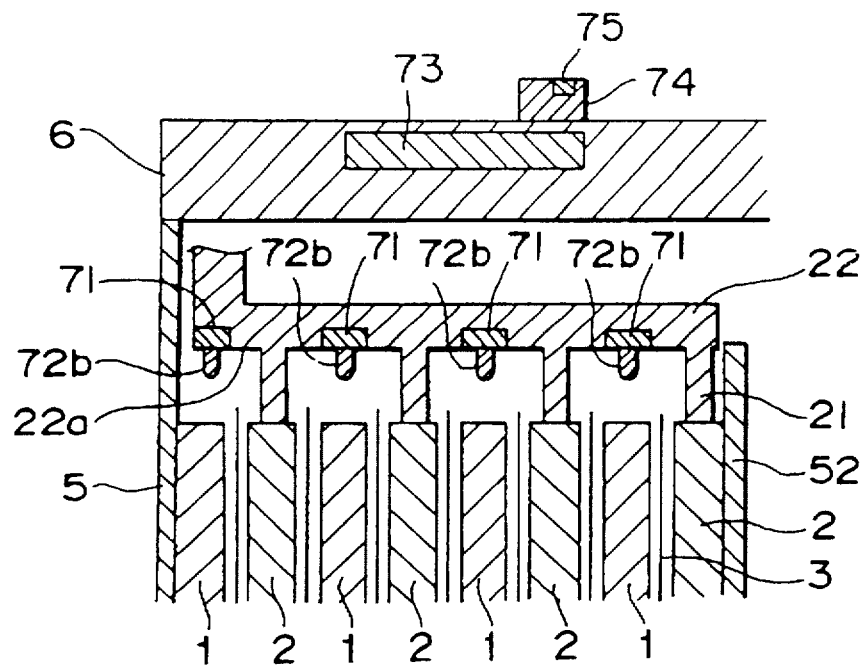
FIG. 28 is a vertical sectional partial view showing the lead-acid storage battery with life indicator of embodiment 14.

In the lead-acid storage battery, when the growth occurring on the positive plate 1 contacts with the negative strap 22, the short-circuiting is created to exhaust the battery life. According to the life indicator of this embodiment, however, the occurrence of growth at lower part of the negative strap 22 can be detected before the growth comes in contact with t e negative strap 22. Thus, the short-circuiting can be prevented securely.
Embodiment 14:

FIG. 28 is a vertical sectional partial view of seventh example of the lead-acid storage battery with life indicator. This life indicator comprises plural (four, in this case) sensor portions 71 fitted to the lower face 22a of the negative strap 22, bar bodies 72b formed integrally with each sensor portion 71, one sending circuit 73 installed in inside of the cover 6, and one receiving circuit 74 and one indicator means 75 installed on an outside face of the cover 6. Anyone of the above-mentioned sensor portions 71 except for that of the embodiment 7 may be used for this sensor portion 71. The sensor portion 71 is so fitted to the lower face 22a of the negative strap 22 that the pressed sheet 711 is flush with the lower face 22a. In this case, the sending circuit 73 may be installed in inside of a side wall of the container 5, and the receiving circuit 74 and the indicator means 75 may be installed on the outside face of the side wall of the container 5.

In this lead-acid storage battery, the pressed sheet 711 of each sensor portion 71 is applied with a pressure by the bar body 72b applied with a pressure, which is produced by the positive plate 1 located at the lower part of each sensor portion 71, directly from the growth. Thus, the change of electric parameter is detected by the sensor portion 71.

Figure 29:
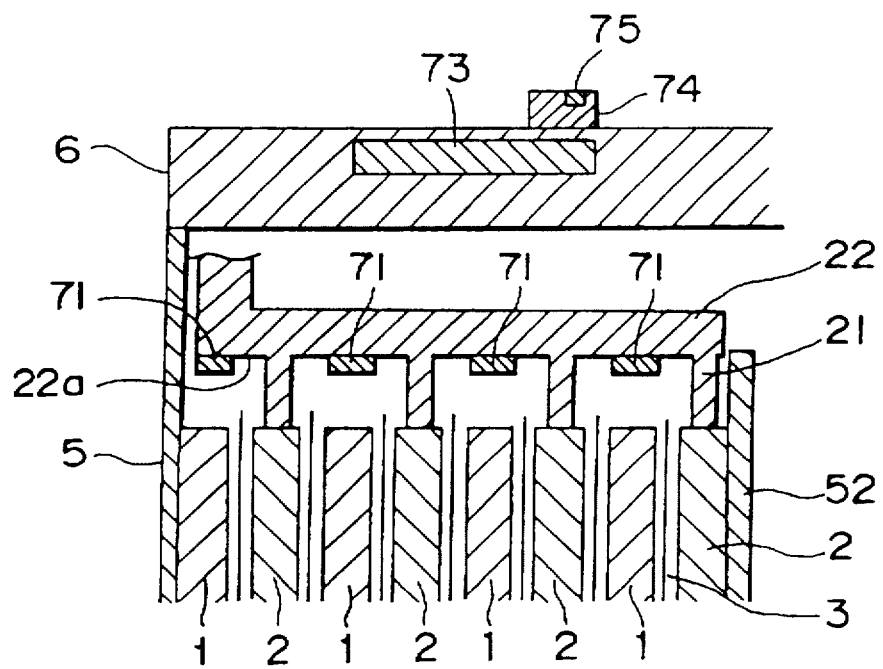
FIG. 29 is a vertical sectional partial view showing the lead-acid storage battery with life indicator of embodiment 15.

In the lead-acid storage battery, the occurrence of growth in each positive plate 1 located at lower part of the negative strap 22 is not necessarily uniform, and there may be a case where a growth of particular positive plate 1 is rapidly created to be in contact with the negative strap 22. According to the life indicator of this embodiment, however, many occurrences of growth in the positive plates 1 located at lower parts of the negative straps 22 can be detected. Therefore, a possibility of overlooking a local occurrence of growth is minimized and the impairing of air-tightness due to the pushed-up cover 6 by local growth is prevented.
Embodiment 15:

FIG. 29 is a vertical sectional partial view of eighth example of the lead-acid e battery with life indicator. This life indicator comprises plural (four, in this case) sensor portions 71 fitted to the lower face 22a of the negative strap 22, one sending circuit 73 installed in inside of the cover 6, and one receiving circuit 74 and one indicator means 75 installed on an outside face of the cover 6. Anyone of the above-mentioned sen or portions 71 except for that of the embodiment 7 may be used for this sensor portion 71. The sensor portion 71 is fitted to the lower face 22a of the negative strap 22 so as to protrude downward from the lower face 22a of the negative strap 22. The sending circuit 73 is installed in inside of the side wall of the container 5, and the receiving circuit 7 and the indicator means 75 are installed on the outside face of the side wall of the container 5.

In this lead-acid storage battery, the pressed sheet 711 of each sensor portion 71 is applied with a pressure directly by the growth occurring at the positive plate 1 located at the lower part of each sensor portion 71, and the change of electric parameter is detected by the sensor portion 71.

Figure 30:
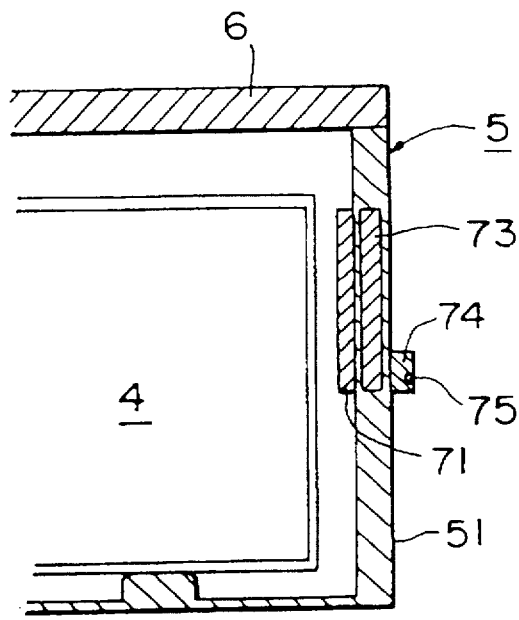
FIG. 30 is a vertical sectional partial view showing the lead-acid storage battery with life indicator of embodiment 16.

The same function and effect as that of the embodiment 14 is obtainable even by the life indicator of this embodiment.
Embodiment 16:

FIG. 30 is a vertical sectional partial view showing a ninth example of the lead-acid storage battery with life indicator. This life indicator comprises one sensor portion 71 installed on an inside face of a side wall 51 of the container 5, one sending circuit 73 installed in inside of the side wall 51, and one receiving circuit 74 and one indicator means 75 installed on an outside face of the side wall 51. Anyone of the above-mentioned sensor portions 71 may be used for this sensor portion 71. The sensor portion 71 is so installed that the presses sheet 711 is positioned at a side of the group of positive and negative plates 4 in its vertical position.

In this lead-acid storage battery, the pressed sheet 711 of the sensor portion 71 is applied with a pressure directly by the growth occurring at the positive plate 1 in lateral direction.

In the lead-acid storage battery, there is a fear that the container 5 is pushed and broken by the growth occurring at the positive plate 1 in lateral direction. According to the life indicator of this embodiment, however, the occurrence of growth can be detected before the growth occurring in lateral direction applies a pressure on the container 5. Therefore, the breakage of the container 5 can be prevented securely.

Figure 31:
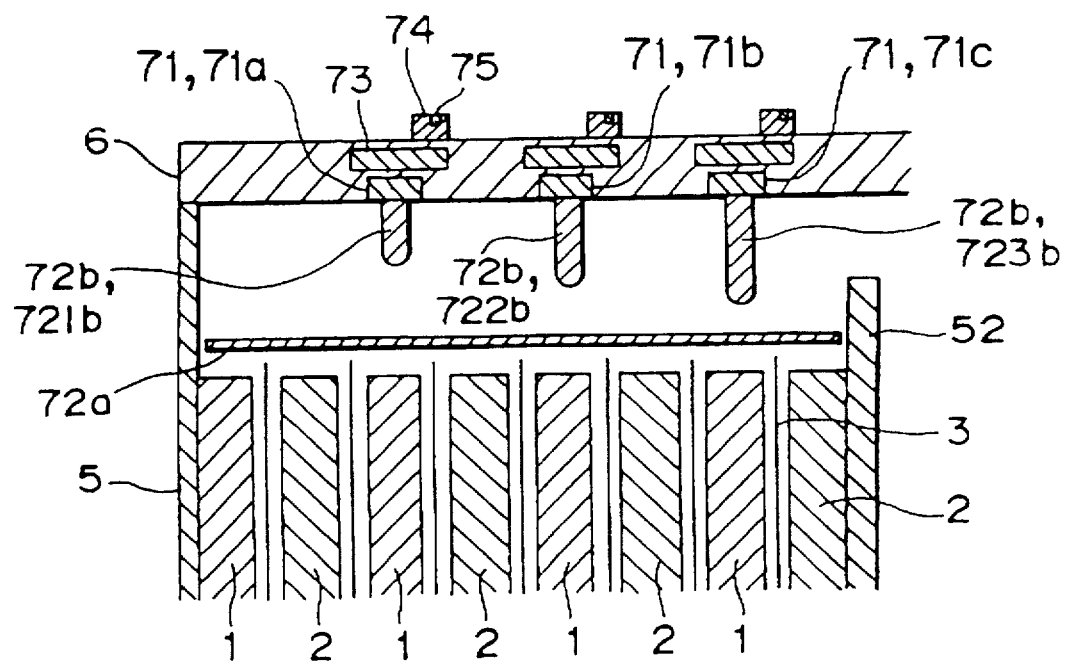
FIG. 31 is a vertical sectional partial view showing the lead-acid storage battery with life indicator of embodiment 17.

Embodiment 17:

FIG. 31 is a vertical sectional partial view showing a tenth example of the lead-acid storage battery with life indicator. This life indicator comprises plural (three, in this case) sensor portions 71 installed on the cover 6, bar bodies 72b having the same quantity as the sensor portions 71, one sheet body 72a, sending circuits 73 connected to the sensor portions 71 and installed in inside of the cover 6, and receiving circuits 74 and indicator means 75 fronting on the sending circuits 73 and installed on an outside face 62 of the cover 6. The bar bodies 72b are installed on the sensor portions 71 perpendicularly to and downward from the sensor portions 71, respectively. The bar bodies 72b are different in their lengths each other, and their lengths become long in an order of the bar bodies 721b, 722b and 723b, respectively.

Figure 32:
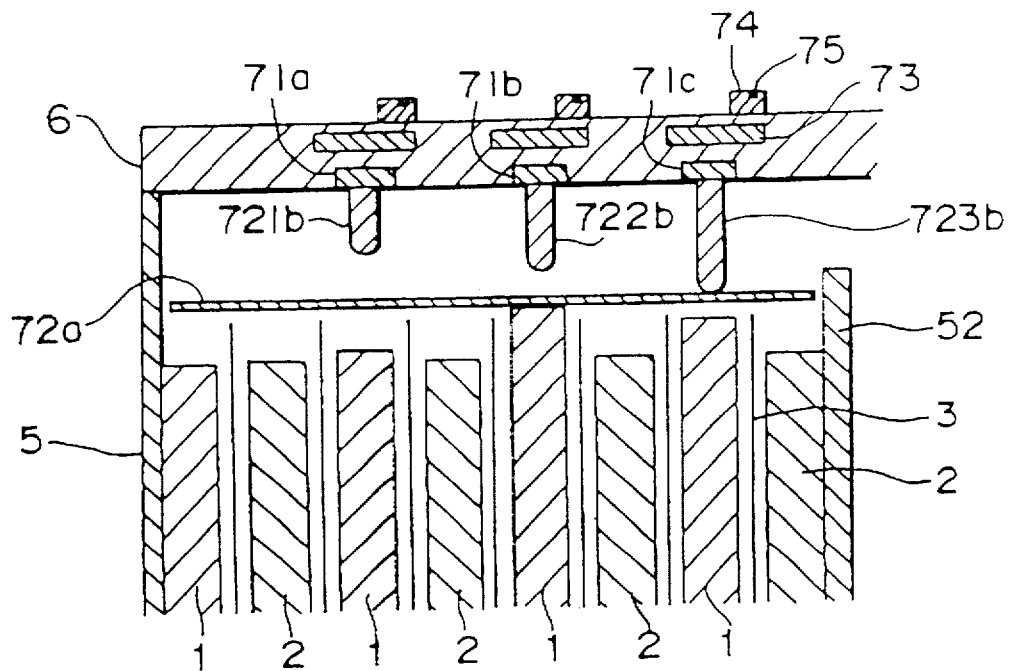
FIG. 32 is a vertical sectional view showing a function of the life indicator of embodiment 17.
Figure 33:
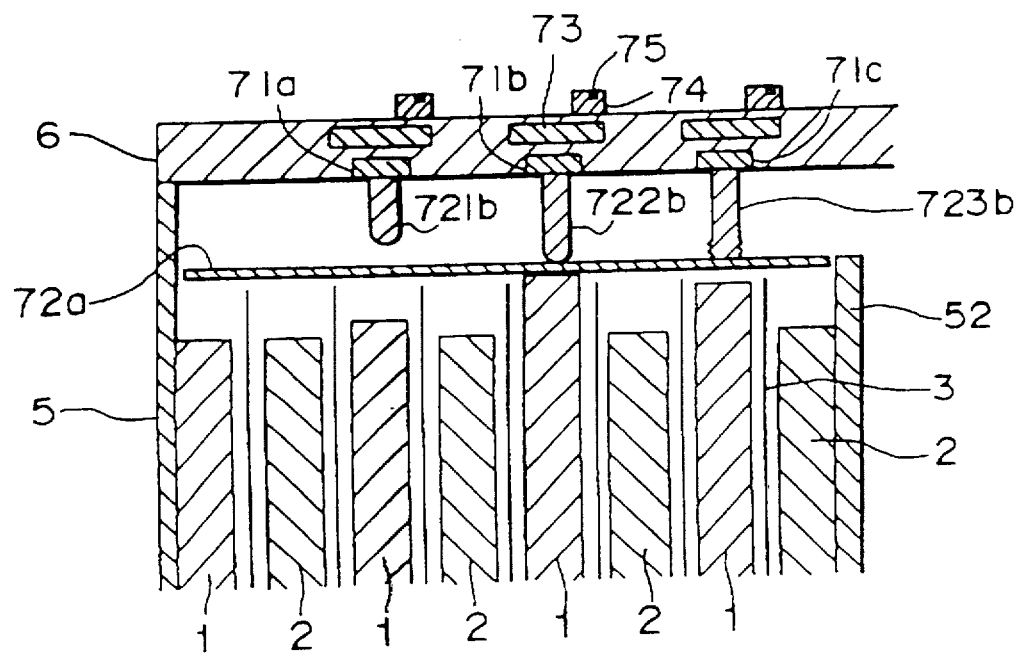
FIG. 33 is a vertical sectional view showing a function of the life indicator of embodiment 17.
Figure 34:
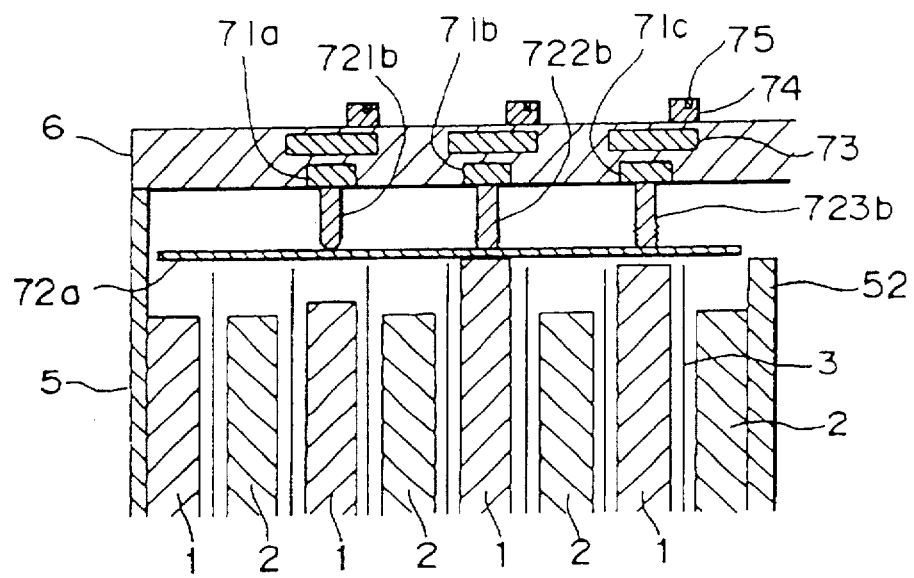
FIG. 34 is a vertical sectional view showing a function of the life indicator of embodiment 17.

In this lead-acid storage battery, the sheet body 72a is pushed up when the growth occurs at the positive plate 1. In the first place, as shown in FIG. 32, a lower end of the bar body 723b comes in contact with the sheet body 72a to apply a pressure on the sensor portion 71c, so that a change of electric parameter is detected at the sensor portion 71c. In the second place, as shown in FIG. 33, a lower end of the bar body 722b comes in contact with the sheet body 72a to apply a pressure on the sensor portion 71b, so that a change of electric parameter is detected at the sensor portion 71b. In the third place, as shown in FIG. 34, a lower end of the bar body 721b comes in contact with the sheet body 72a to apply a pressure on the sensor portion 71a, so that a change of electric parameter is detected at the sensor portion 71a. Here, the bar body 72b has a resiliency and elasticity because it is made of butyl rubber. Therefore, at time of workings in FIG. 33 & FIG. 34, the bar bodies 723b & 722b shrink while applying the pressure on the sensor portions 71c & 71b, so that no excessive pressure will be applied on the sensor portions 71c & 71b.

Accordingly, an initial stage of occurrence of growth is detected at the sensor portion 71c, an intermediate stage of occurrence of growth is detected at the sensor portion 71b, and the final stage of occurrence of growth is detected at the sensor portion 71a. Namely, the occurrence of growth is detected sequentially in stages. For instance, when a largeness of growth detected at the sensor portion 71a is set to a limit value at which the life of lead-acid storage battery is exhausted if exceeded, the life of lead-acid storage battery can be detected securely. Further, when a largeness of growth detected at the sensor portion 71b is set to a limit value by which a remaining life can be estimated, it becomes possible to make a preparation for exchange work etc. after exhaustion of the life with a sufficient time.

A component formed by integrating the sensor portion 71 with the bar body 72b may be used.

Figure 35:
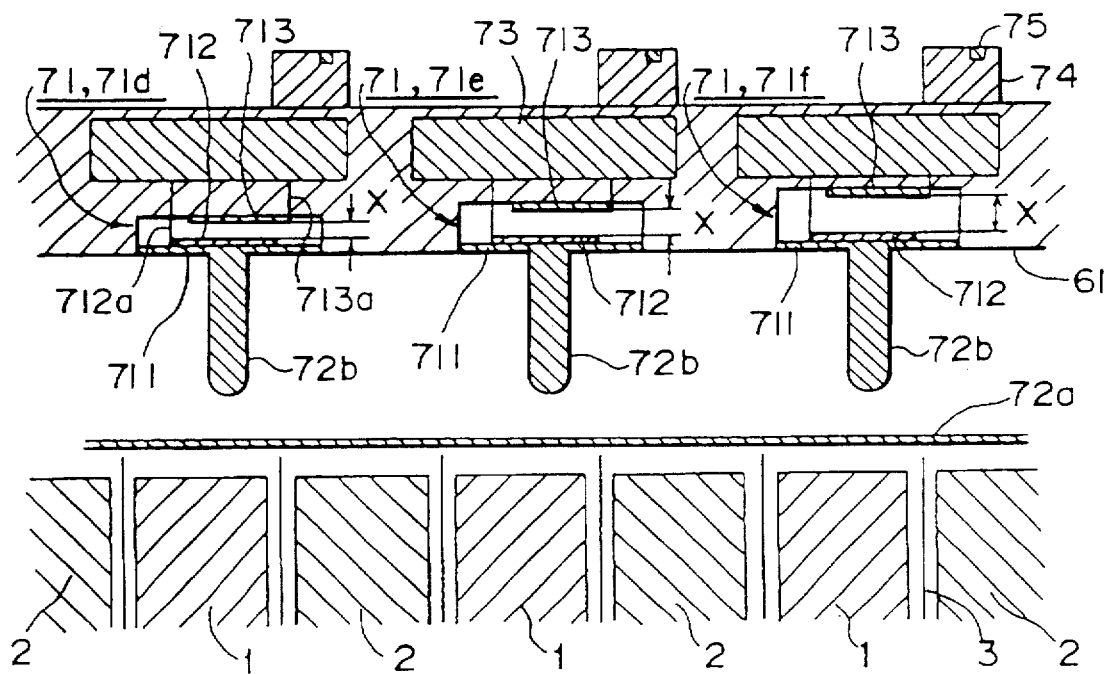
FIG. 35 is a vertical sectional view showing the life indicator of embodiment 18.

Embodiment 18:

FIG. 35 is a vertical sectional partial view showing an eleventh example of the lead-acid storage battery with life indicator. This life indicator is one which detects the occurrence of growth in stages too, in the same way as that of the embodiment 17. This life indicator comprises plural (three, in this case) sensor portions 71 installed on the cover 6, bar bodies 72b having the same quantity as the sensor portions 71, one sheet body 72a, sending circuits 73 connected to the sensor portions 71 and installed in inside of the cover 6, and receiving circuits 74 and indicator means 75 fronting on the sending circuits 73 and installed on an outside face 62 of the cover 6. The bar bodies 72b are integrally installed on the sensor portions 71 perpendicularly to and downward from the sensor portions 71, respectively. The sensor portion 71 has the same structure as that of the sensor portion 71 shown in FIG. 3, however, distances X between the electric contacts 712 & 713 become longer in an order of sensor portions 71d, 71e and 71f. The bar bodies 72b have the same length at all.

In this lead-acid storage battery, the sheet body 72a is pushed up when the growth occurs at the positive plate 1. At the same time, lower ends of respective bar bodies 72b contact with the sheet body 72a to apply pressure on the sensor portions 71d, 71e & 71f simultaneously. In the first place, the electric contacts 712 & 713 come in contact with each other to detect a creation of electric signal i.e. detect the occurrence of growth by the sensor portion 71d at which the distance X is shortest. In the second place, the occurrence of growth is detected by the sensor portion 71e in the same way. In the third place, the occurrence of growth is detected by the sensor portion 71f in the same way.

Accordingly, an initial stage of occurrence of growth is detected at the sensor portion 71d, an intermediate stage of occurrence of growth is detected at the sensor portion 71e, and the final stage of occurrence of growth is detected at the sensor portion 71f. Namely, the occurrence of growth is detected sequentially in stages. Thus, the same function and effect as that of the embodiment 17 is obtainable.

A component formed by integrating the sensor portion 71 with the bar body 72b may be used.

Figure 36:
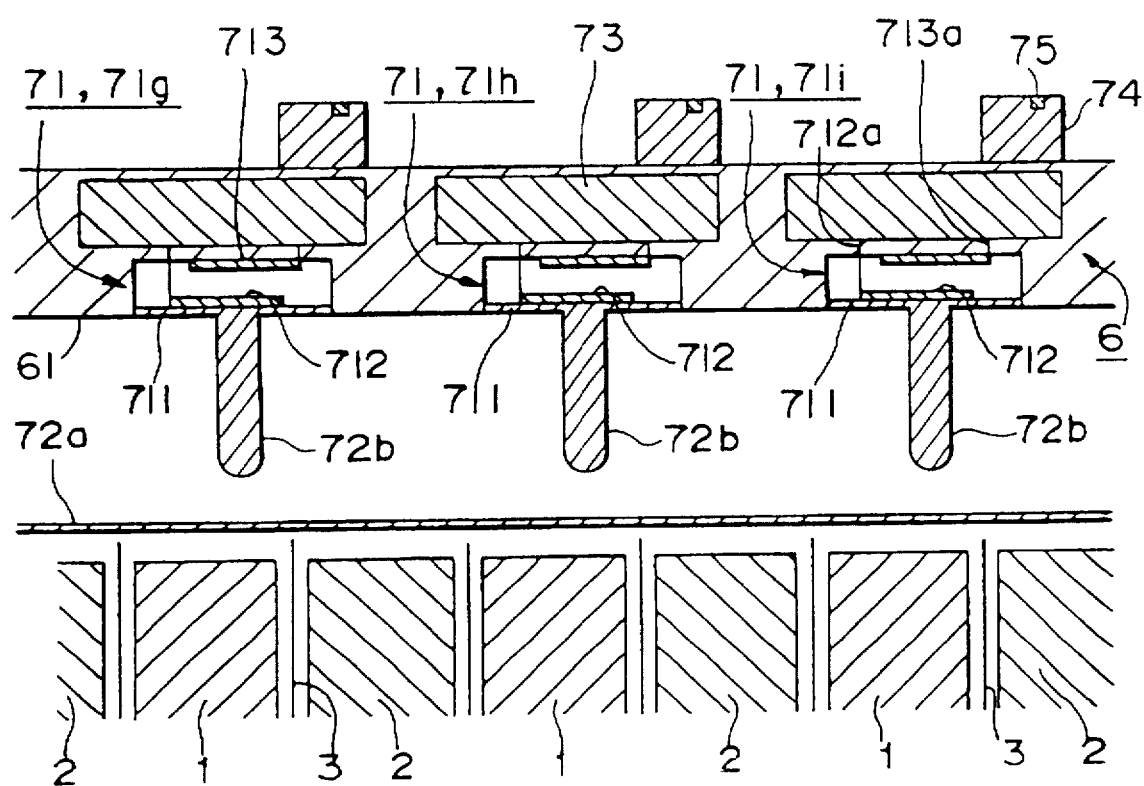
FIG. 36 is a vertical sectional view showing the life indicator of embodiment 19.
Figure 37:
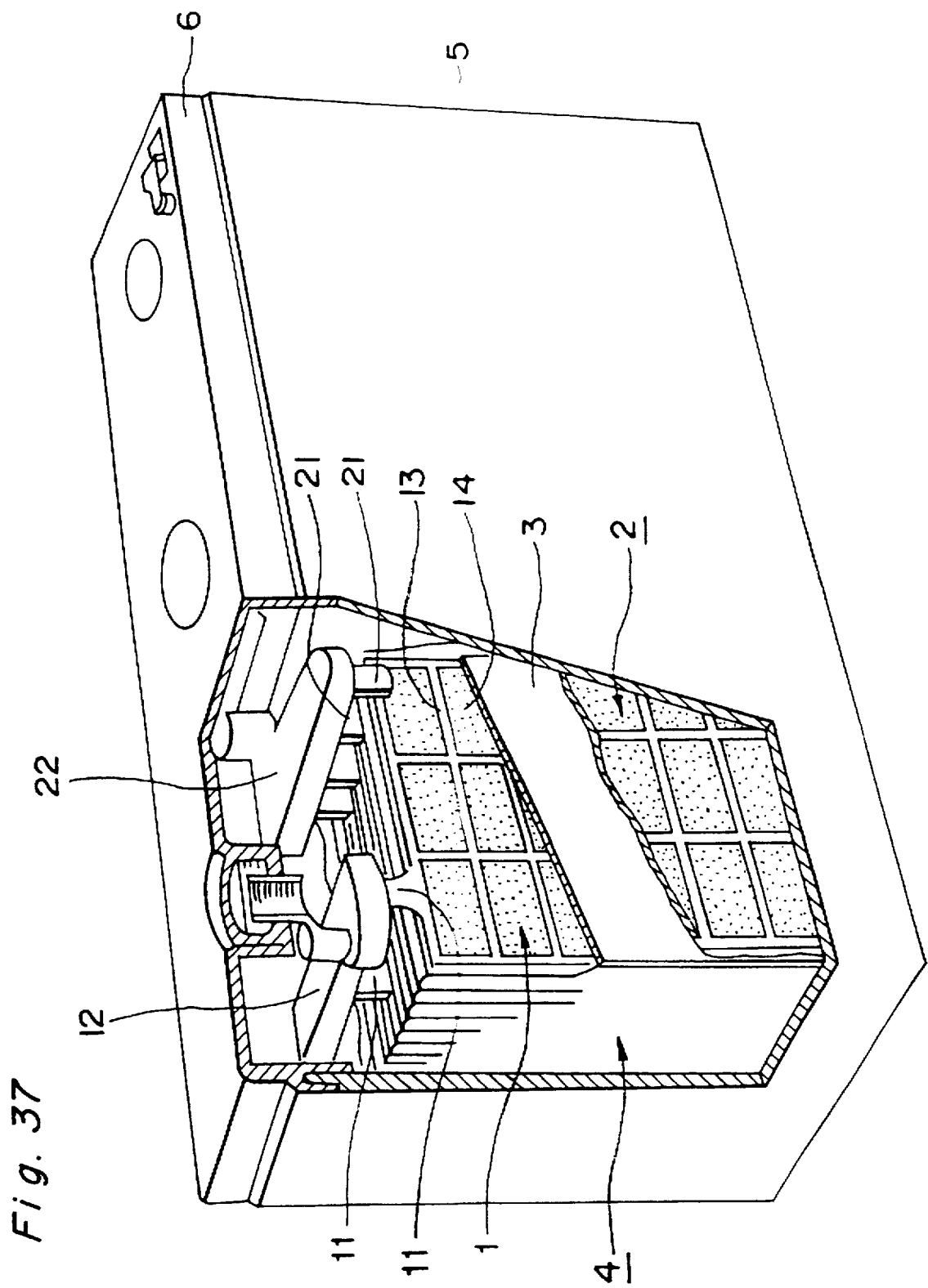
FIG. 37 is a partially fragmental oblique view showing a general conventional sealed-type lead-acid storage battery.

Embodiment 19:

FIG. 36 is a vertical sectional partial view showing an twelfth example of the lead-acid storage battery with life indicator. This life indicator is one which detects the occurrence of growth in stages too, in the same way as that of the embodiment 17. This life indicator comprises plural (three, in this case) sensor portions 71 installed on the cover 6, bar bodies 72b having the same quantity as the sensor portions 71, one sheet body 72a, sending circuits 73 connected to the sensor portions 71 and installed in inside of the cover 6, and receiving circuits 74 and indicator means 75 fronting on the sending circuits 73 and installed on an outside face 62 of the cover 6. The sensor portion 71 has the same structure as that of the sensor portion 71 shown in FIG. 3, however, resilient forces of used pressed sheets 711 become smaller in an order of sensor portions 71g, 71h and 71i. In other words, the used pressed sheets 711 become stiff in an order of sensor portions 71g, 71h and 71i. The bar bodies 72b have the same length at all.

In this lead-acid storage battery, the sheet body 72a is pushed up when the growth occurs at the positive plate 1. At the same time, lower ends of respective bar bodies 72b contact with the sheet body 72a to apply pressure on the sensor portions 71g, 71h & 71i simultaneously. In the first place, the electric contacts 712 & 713 come in contact with each other to detect a creation of electric signal i.e. detect the occurrence of growth by the sensor portion 71g equipped with the pressed sheet 711 having the largest resilient force. In the second place, the occurrence of growth is detected by the sensor portion 71h in the same way. In the third place, the occurrence of growth is detected by the sensor portion 71i in the same way.

Accordingly, an initial stage of occurrence of growth is detected at the sensor portion 71g, an intermediate stage of occurrence of growth is detected at the sensor portion 71h, and the final stage of occurrence of growth is detected at the sensor portion 71i. Namely, the occurrence of growth is detected sequentially in stages. Thus, the same function and effect as that of the embodiment 17 is obtainable.

The same function and effect is obtainable when changing a resilient force of the bar body 72b in place of changing the resilient force of the pressed sheet 711.

12. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion is installed on a lower face of a negative strap, the sending means is installed in a cover inside or container side wall inside, and the receiving means and the indicator means are installed on a cover outside face or a container side wall outside face.

13. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion is installed on a container side wall inside face, the sending means is installed in a container side wall inside, and the receiving means and the indicator means are installed on a container side wall outside face.

14. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a chance of electric parameter, in which the life indicator has a spacer between the sensor portion and the positive plate, the spacer is adapted to apply a pressure the sensor portion on receipt of the elongation of the positive plate, the spacer comprises only a bar body fixed to the sensor portion perpendicularly to the sensor portion, and the sensor portion having the spacer is installed at plural places different each other.

15. A lead-acid storage battery-with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the life indicator has a spacer between the sensor portion and the positive plate, the spacer is adapted to apply a pressure the sensor portion on receipt of the elongation of the positive plate, the spacer comprises a sheet body mounted on a group of positive and negative plates and a bar body fixed to the sensor portion perpendicularly to the sensor portion, the sensor portions and the bar bodies are installed on different plural places in pairs, and lengths of the bar bodies are different each other.

16. A lead-acid storage battery with life indicator having a life indicator detecting an elongation of a positive plate, in which the life indicator has at least a sensor portion, a sending means sending a chance of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portions are installed at plural places different each other.

17. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion has a resilient pressed part and a pair of electric contacts and is adapted to close the pair of contacts installed with a distance put between them in a pressure applied direction when the pressed part is applied with pressure, the sensor portions are installed at plural places different each other, and each sensor portion is different in a distance of the pair of electric contacts in the pressure applied direction.

18. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a chance of electric parameter, in which the sensor portion has a resilient pressed part and a pair of electric contacts and is adapted to close or open the pair of contacts when the pressed part is applied with pressure, the sensor portions are installed at plural places different each other, and each sensor portion is different in a resilient force of the pressed part.

What is claimed is:

1. A battery life indicator having at least a sensor portion, a sending means sending a chance of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a chance of electric parameter, in which the sending means has a primary coil, the receiving means has a secondary coil, and the both means are adapted to transmit the electric signal through electromagnetic induction.

2. A battery life indicator having at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sending means is adapted to oscillate when the sensor portion detects a creation of electric signal as a change of electric parameter.

3. A battery life indicator having at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sending means is adapted to be in an open-state when the sensor port on detects a cut-off of electric signal as a change of electric parameter.

4. A battery life indicator having at least sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sending means is adapted to send a frequency information corresponding to a change of electric signal when the sensor portion detects the change as a change of electric parameter.

5. A battery life indicator having at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion has a resilient pressed part and a pair of electric contacts, and the pair of electric contacts are adapted to close or open when the pressed part is applied with pressure.

6. A battery life indicator having at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion has a resilient pressed part and a pressure-sensitive conductor connecting a pair of electric contacts installed with a distance put between them, and is adapted to detect a change of resistance value of the pressure-sensitive conductor when the pressed part is applied with pressure.

7. A battery life indicator having at least a sensor portion, a sending means sending a change of electric parameter detected by the sensor portion as an electric signal, a receiving means receiving a sent signal, and an indicator means indicating the received signal, the sensor portion is adapted to receive an applied pressure based on an elongation of a positive plate lattice body, so as to detect the applied pressure as a change of electric parameter, in which a spacer is installed between the sensor portion and a positive plate, and the spacer is adapted to apply a pressure on the sensor portion on-receipt of the elongation of the positive plate.

8. A battery life indicator as set forth in claim 7, in which the spacer comprises a sheet body mounted on a group of positive and negative plates and a bar body fixed to the sensor portion perpendicularly to the sensor portion.

9. A battery life indicator as set forth in claim 7, in which the spacer comprises only a bar body fixed to the sensor portion perpendicularly to the sensor portion.

10. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sending means has a primary coil, the receiving means has a secondary coil, and the both means are adapted to transmit the electric signal through electromagnetic induction.

11. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the sensor portion is installed on a cover inside face, the sending means is installed in the cover inside, and the receiving means and the indicator means are installed on a cover outside face.

19. A lead-acid storage battery with life indicator having a life indicator detecting an elongation of a positive plate, in which the life indicator has at least a sensor portion, a sending means sending a change of electric parameter detected by the sensor portion as an electric signal, a receiving means receiving a sent signal, and an indicator means indicating the received signal, and the sensor portion is adapted to receive an applied pressure based on an elongation of a positive plate lattice body, so as to detect the applied pressure as a change of electric parameter, in which the life indicator has a spacer between the sensor portion and the positive plate, the spacer is adapted to apply a pressure on the sensor portion on receipt of the elongation of the positive plate, the spacer has at least a bar body fixed to the sensor portion perpendicularly to the sensor portion, and the sensor portions and the bar bodies are installed on plural places different each other in pairs, and lengths of the bar bodies are different each other.

* * * * *

UNITED STATES PATENT AND TRADEMARK OFFICE
CERTIFICATE OF CORRECTION

PATENT NO. : 5,750,285
DATED : May 12, 1998
INVENTOR(S) : Akutagawa et al.

It is certified that error appears in the above-identified patent and that said Letters Patent is hereby corrected as shown below:

Title page, item [73], change the Assignee data from "Yuasa Corporation, Tokyo, Japan" to --Tadamasa Akutagawa, Tokyo, Japan and Yuasa Corporation, Osaka, Japan--.

Signed and Sealed this

Twenty-seventh Day of October, 1998

Attest:

BRUCE LEHMAN

*Attesting Officer*      *Commissioner of Patents and Trademarks*